US008296007B2

(12) United States Patent
Swaminathan et al.

(10) Patent No.: US 8,296,007 B2
(45) Date of Patent: Oct. 23, 2012

(54) EMBEDDED VEHICLE DATA RECORDING TOOLS FOR VEHICLE SERVICING

(75) Inventors: Radhakrishnan Swaminathan, Grand Blanc, MI (US); Darren Peter Shelcusky, Saline, MI (US); Timothy Brian DeBorde, Carleton, MI (US); Kenneth Dorony, South Lyon, MI (US); James Eric Kamiske, Brownstown, MI (US); Patrick Joseph Dwan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 12/774,008

(22) Filed: May 5, 2010

(65) Prior Publication Data

US 2011/0276219 A1 Nov. 10, 2011

(51) Int. Cl.
*G01M 17/00* (2006.01)

(52) U.S. Cl. ..................................... 701/29.1; 701/31.4

(58) Field of Classification Search ................. 701/29.1, 701/31.4

See application file for complete search history.

(56) References Cited

U.S. PATENT DOCUMENTS

| | | | |
|---|---|---|---|
| 5,781,125 | A | 7/1998 | Godau et al. |
| 5,922,041 | A | 7/1999 | Anderson |
| 6,434,455 | B1 | 8/2002 | Snow et al. |
| 6,553,292 | B2 | 4/2003 | Kokes et al. |
| 6,598,183 | B1 | 7/2003 | Grieco et al. |
| 6,603,394 | B2 | 8/2003 | Raichle et al. |
| 6,611,740 | B2 | 8/2003 | Lowrey et al. |
| 6,636,790 | B1 | 10/2003 | Lightner et al. |
| 6,687,587 | B2 | 2/2004 | Kacel |
| 6,738,697 | B2 | 5/2004 | Breed |
| 6,778,888 | B2 | 8/2004 | Cataldo et al. |
| 6,978,198 | B2 | 12/2005 | Shi |
| 7,146,307 | B2 | 12/2006 | Mocek |
| 7,155,321 | B2 | 12/2006 | Bromley et al. |
| 7,228,211 | B1 | 6/2007 | Lowrey et al. |
| 7,232,962 | B2 * | 6/2007 | Rynd ............................ 177/140 |
| 7,340,365 | B2 | 3/2008 | Wubbena et al. |
| 7,343,526 | B2 | 3/2008 | Aditham |
| 7,379,541 | B2 | 5/2008 | Iggulden et al. |

(Continued)

FOREIGN PATENT DOCUMENTS

JP 9264819 A 10/1997

(Continued)

OTHER PUBLICATIONS

K. Whitfield, A hitchhiker's guide to the telematics ecosystem, printed from findarticles.com on Aug. 4, 2009.

(Continued)

*Primary Examiner* — Hussein A. Elchanti

(74) *Attorney, Agent, or Firm* — Jennifer M. Stec; Brooks Kushman P.C.

(57) ABSTRACT

Various embodiments include tools for vehicle data recording for vehicle servicing. A methods, a computer for installation in a vehicle, and a computer program product may be provided for recording diagnostic vehicle data. An input may be received from memory including a plurality of vehicle data recording parameters which comprise a vehicle data recording configuration. A data recording trigger signal may also be received. Upon receipt of the trigger signal, diagnostic data may be received from one or more vehicle modules over a vehicle network communicating with the computer. The diagnostic data may be based on the vehicle data recording configuration. The diagnostic data may be stored in memory for diagnosing one or more vehicle concerns.

20 Claims, 20 Drawing Sheets

U.S. PATENT DOCUMENTS

| | | | |
|---|---|---|---|
| 7,487,074 | B2 | 2/2009 | Ohtsu et al. |
| 7,532,962 | B1 * | 5/2009 | Lowrey et al. ............... 701/32.3 |
| 7,590,476 | B2 | 9/2009 | Shumate |
| 8,126,644 | B2 | 2/2012 | Amano |
| 8,140,358 | B1 * | 3/2012 | Ling et al. ......................... 705/4 |
| 2002/0035429 | A1 | 3/2002 | Banas |
| 2002/0173885 | A1 | 11/2002 | Lowrey et al. |
| 2003/0034769 | A1 * | 2/2003 | Lipscomb et al. .......... 324/99 D |
| 2003/0036832 | A1 | 2/2003 | Kokes et al. |
| 2003/0163587 | A1 | 8/2003 | Knight et al. |
| 2004/0044454 | A1 | 3/2004 | Ross et al. |
| 2004/0054503 | A1 | 3/2004 | Namaky |
| 2004/0128071 | A1 | 7/2004 | Schradi |
| 2005/0096020 | A1 | 5/2005 | Oesterling et al. |
| 2005/0097541 | A1 * | 5/2005 | Holland ........................ 717/168 |
| 2006/0034231 | A1 | 2/2006 | Tailor |
| 2006/0041348 | A1 | 2/2006 | Liebl et al. |
| 2006/0130033 | A1 | 6/2006 | Stoffels et al. |
| 2006/0155437 | A1 * | 7/2006 | Wang et al. ...................... 701/29 |
| 2006/0229777 | A1 | 10/2006 | Hudson et al. |
| 2006/0253235 | A1 | 11/2006 | Bi et al. |
| 2007/0162796 | A1 | 7/2007 | Chan et al. |
| 2007/0171029 | A1 | 7/2007 | Inbarajan |
| 2007/0179799 | A1 | 8/2007 | Laghrari |
| 2008/0015748 | A1 | 1/2008 | Nagy |
| 2008/0027605 | A1 | 1/2008 | Oesterling |
| 2008/0027606 | A1 | 1/2008 | Helm |
| 2008/0147267 | A1 * | 6/2008 | Plante et al. .................... 701/35 |
| 2008/0167056 | A1 | 7/2008 | Gilzean et al. |
| 2009/0177352 | A1 | 7/2009 | Grau et al. |
| 2009/0292416 | A1 | 11/2009 | Ubik et al. |
| 2009/0308134 | A1 | 12/2009 | Pepper |
| 2010/0256861 | A1 | 10/2010 | Hodges |
| 2011/0046883 | A1 | 2/2011 | Ross et al. |
| 2011/0276218 | A1 | 11/2011 | Dwan et al. |

FOREIGN PATENT DOCUMENTS

| | | | |
|---|---|---|---|
| JP | 11326140 | A | 11/1999 |
| JP | 2006018680 | A | 1/2006 |

OTHER PUBLICATIONS

Ford Motor Company, "Navigation System: SYNC," Owner's Guide Supplement, SYNC Version 1 (Jul. 2007).

Ford Motor Company, "SYNC," Owner's Guide Supplement, SYNC Version 1 (Nov. 2007).

Ford Motor Company, "Navigation System: SYNC," Owner's Guide Supplement, SYNC Version 2 (Oct. 2008).

Ford Motor Company, "Navigation System: SYNC," Owner's Guide Supplement, SYNC Version 3 (Jul. 2009).

Ford Motor Company, "SYNC," Owner's Guide Supplement, SYNC Version 3 (Aug. 2009).

DrewTech gets you on the Bus, article printed from www.drewtech.com, Dec. 16, 2009.

Software, Pass Thru Pro II, J2534 Flash Reprogramming, printed from buy1.snapon.com, Dec. 3, 2009.

Introduction to J2534 and Flash Reprogramming, Drew Technologies, Copyright 2009.

Ford Motor Company, "SYNC," Owner's Guide Supplement, SYNC Version 2 (Oct. 2008).

* cited by examiner

EMBEDDED VEHICLE DATA RECORDING TOOLS FOR VEHICLE SERVICING

BACKGROUND

1. Technical Field

Various embodiments may include a method and system for vehicle servicing. In some embodiments, vehicle data may be recorded using embedded vehicle data recording tools.

2. Background Art

Vehicle data recording system are used by dealerships and service shops for diagnosing vehicle concerns in a service bay. In current implementations of the system, a physical vehicle data recording (VDR) box is used to capture and store vehicle data from the vehicle. One or more wired connections (e.g., a vehicle network cable such as a CAN or GMLAN cable) is connected to the vehicle data recording box and the vehicle's diagnostic connector (such as a SAE J-1962 connector) to retrieve vehicle data from the vehicle and store the data in VDR box.

As is known in the art, a J-1962 connector is a 16-pin communication box located on the driver's side of vehicles used for connecting vehicle diagnostic tools. The J-1962 connector in an intermediary connection between the diagnostic tool (such as a vehicle data recorder) and a vehicle network (such a CAN) for retrieving and/or receiving vehicle diagnostic data.

A triggering device is connected to the hardware (i.e., vehicle data recording box) using a wired connection for activating data recording from the vehicle. Upon selection of the trigger, vehicle data is received over a vehicle network and stored/recorded in the vehicle data recording box.

The vehicle data recording box is also connected to a client terminal (e.g., a personal computer or a handheld device) using one or more wired connections. The vehicle data recording box is generally connected to the client terminal in order to upload the recorded vehicle data from the vehicle data recording box to the client terminal. A power supply may provide power to the vehicle data recording box.

A terminal host cable and a terminal-to-VDR cable connect the vehicle data recording box and the client terminal to facilitate communication between the two devices. The transmitted vehicle data is further analyzed and/or displayed from client terminal.

Prior to recording data from the vehicle, information may be received by the VDR (e.g., via the client terminal) that is used for recording vehicle data. This information is stored in the vehicle data recording hardware.

Accordingly, current vehicle data recording systems generally include physical hardware for recording vehicle data. The physical hardware includes programmed instructions and software that is capable of receiving diagnostic data from the vehicle data network via a J-1962 diagnostic connector and recording this information in memory. The physical hardware is connected to diagnostic connectors (such as the J-1962 connector) through a physical, wired connection in order to retrieve/receive and record vehicle diagnostic information. Processing and playback of the recorded data is accomplished via the vehicle data recording hardware.

SUMMARY

One aspect includes a vehicle data recording system. The system may comprise a computer for installation in a vehicle to record diagnostic vehicle data. The computer may be configured to receive input from memory. A plurality of vehicle data recording parameters may be in memory. Further, the vehicle data recording parameters may comprise a vehicle data recording configuration. In one embodiment, the memory is portable memory including, but not limited to, a USB drive, a memory card, and an external hard drive. In other embodiments, the memory is on a personal computer, a mobile communication device, or a portable media player.

The computer may be further configured to receive from one or more vehicle inputs a data recording trigger signal. Upon receipt of the trigger signal, diagnostic data may be received from one or more vehicle modules over a vehicle network communicating with the computer. The diagnostic data may be based on the vehicle data recording configuration. The computer may be further configured to store the diagnostic data in memory for diagnosing one or more vehicle concerns.

The vehicle data recording parameters may include an identification of the vehicle module, one or more diagnostic measurement units for the vehicle module, data recording time, and data for automatically triggering vehicle data recording.

In some embodiments, the memory may further include one or more vehicle data recording programs. The computer may be further configured to receive at least one vehicle data recording program from memory for installation to the computer. The vehicle data recording program may be a transient program.

Another aspect may include a method comprising receiving an input from memory which includes vehicle data recording parameters. A data recording trigger signal may be received from a vehicle input. Diagnostic data based on the vehicle data recording parameters may be received over a vehicle network upon receipt of the trigger signal. The diagnostic data may be in memory for diagnosing vehicle concerns.

The vehicle data recording parameters may include, but are not limited to, an identification of a vehicle module for diagnosis, one or more diagnostic measurement units for the vehicle module, data recording time, and data for automatically triggering vehicle data recording.

In some embodiments, the trigger signal may be a user activated trigger signal from a manual vehicle input. The manual vehicle input may be selected from at least one of a voice input, a steering wheel input, a center stack input, a touchscreen input, or combinations thereof. Additionally or alternatively, the trigger signal may be an automatic trigger signal received from at least one of a powertrain control module, an engine control module, a vehicle control module, or combinations thereof.

Another aspect may include a computer program product for vehicle data recording. The computer program product may be embodied in a computer readable medium in a computer for installation in a vehicle. The computer program product may comprise instructions for establishing a connection with a device having memory. The connection may be an Internet connection.

The memory may include a plurality of vehicle data recording parameters which comprise a vehicle data recording configuration. The computer program may further include instructions for receiving the vehicle data recording configuration stored in memory over the connection. Further, a data recording trigger signal may be received one or more vehicle inputs. Upon receipt of the trigger signal, diagnostic data from one or more vehicle modules may be received over a vehicle network communicating with the computer. The diagnostic data may be based on the vehicle data recording configuration. The computer program product may further include instructions for transmitting the diagnostic data to memory. The diagnostic data may be stored in memory for diagnosing one or more vehicle concerns.

These and other aspects will be better understood in view of the attached drawings and following detailed description of the invention.

BRIEF DESCRIPTION OF THE DRAWINGS

The Figures identified below are illustrative of some embodiments of the invention. The Figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
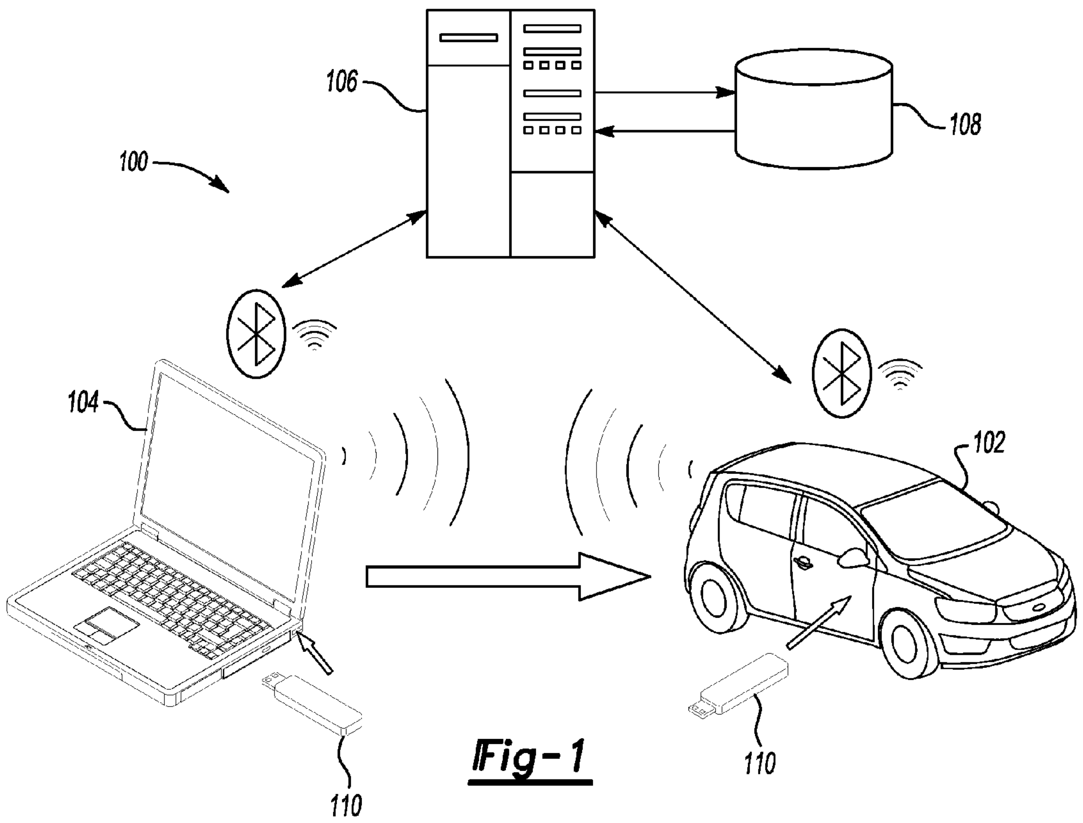
FIG. 1 illustrates a vehicle data recording system that uses embedded vehicle data recording technology.
Figure 4:
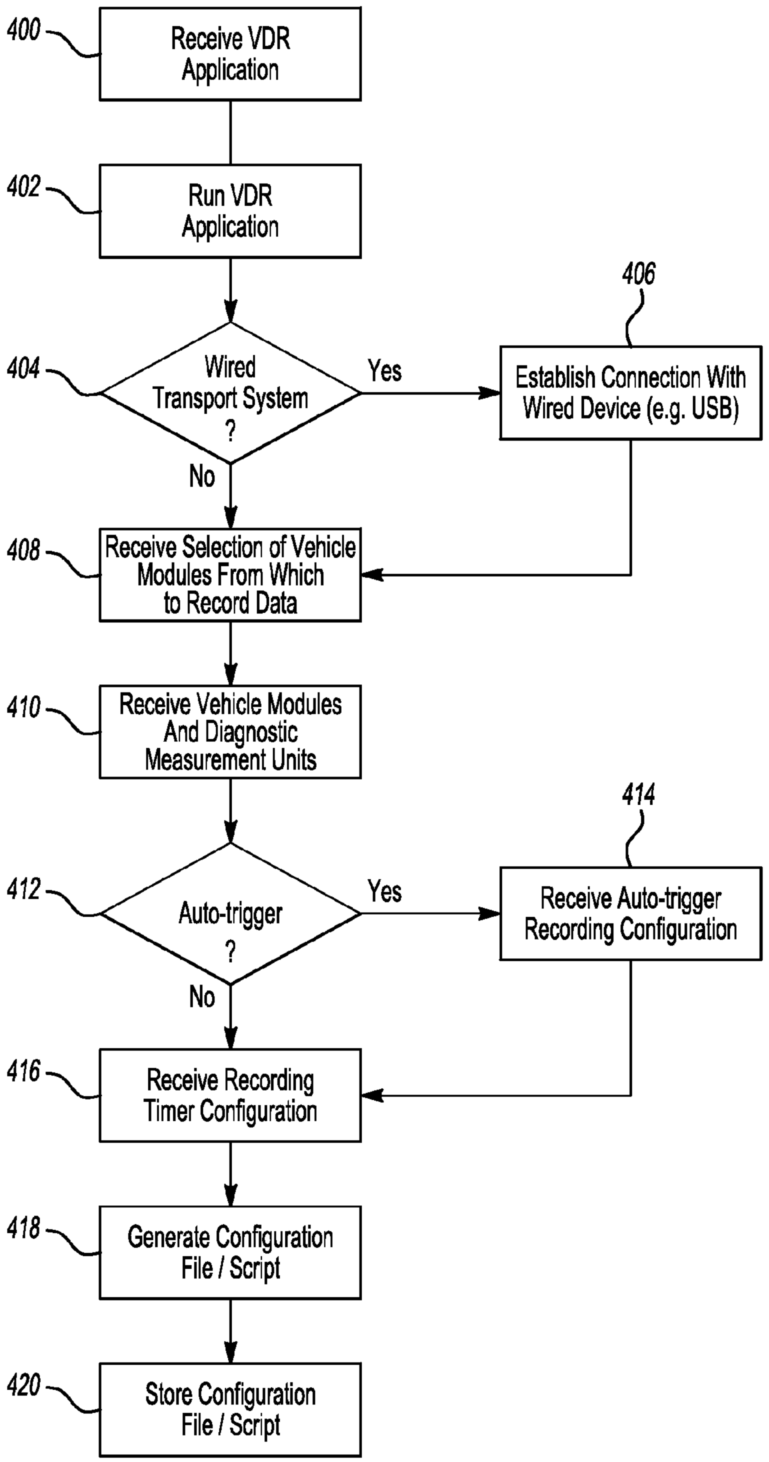
FIG. 4 illustrates an operation for generating and storing a vehicle data recording configuration file for use in vehicle data recording.

FIG. 1 illustrates a vehicle data recording system 100 for embedded vehicle data recording. It will be appreciated that the disclosure and arrangement of FIG. 2 may be modified or re-arranged to best fit a particular implementation of the various embodiments of the invention. One or more vehicle data recording (VDR) applications or programs (having computer readable instructions) may be installed to one or more of the vehicle 102 (e.g., to a vehicle computing system (VCS) as illustrated in FIG. 4) and the client terminal 104. The client side and vehicle side applications may be software written in one or more software programming languages (including, but not limited to, C#/.Net, JAVA and LUA).

The client side VDR application may perform the client (or user) side configuration of the VDR data used in diagnosing vehicle concerns and the client side processing of the VDR data from the vehicle 102. The configuration data may be uploaded to and stored on a portable memory device 110. Non-limiting examples of such portable memory devices 110 include a USB drive, a memory card (e.g., and without limitation, a secure digital (SD) card, a compact flash (CF) card, etc.), an external hard drive, a memory stick, or other suitable device. The client side VDR application may be obtained from a vehicle dealership, an OEM, or a third party (such as a vehicle service shop). In some embodiments, the application may be obtained from a third-party application provider such as the APPLE STORE, BLACKBERRY APP WORLD or ITUNES. In further embodiments, the client side VDR application may be downloaded to the client terminal 104 (e.g., and without limitation, over the Internet) from a website.

Non-limiting examples of client terminal 104 include personal computers (PC), nomadic communication devices (including, but not limited to, mobile phones, cellphones, PDAs, smartphones, and the like), media players, and other like devices. Accordingly, it will be appreciated that the various aspects of FIG. 1 may be modified and re-arranged without departing from the scope of the various embodiments.

The vehicle side VDR application may process the diagnostic information from the vehicle network (e.g., and without limitation, a CAN or GMLAN network). The vehicle side VDR application may also include instructions for transmitting (uploading) and storing the vehicle diagnostic data to the portable memory device 110 for receipt of the vehicle data by the client terminal 104. As illustrated in FIG. 1, the portable memory device 110 may be the same device that is used at the client terminal 104 (e.g., and without limitation, for uploading configuration information from the client terminal 104) and the vehicle 102 (e.g., and without limitation, for storing and/or transporting diagnostic vehicle data). In another embodiment, different portable memory devices may be used. Accordingly, the arrangement of FIG. 1 may be modified without departing from the scope and spirit of the various embodiments.

The vehicle side VDR application may be factory installed by an OEM, installed at the dealership (pre or post sale), installed by a service technician during vehicle servicing or installed by the vehicle owner. The application may be installed from a physical storage medium (e.g., a memory card, USB drive, or other suitable medium) and/or wirelessly downloaded directly to the vehicle (e.g., to the VCS) from an OEM, dealership, service shop, and/or a third-party application provider (such as the APPLE STORE, BLACKBERRY APP WORLD or ITUNES).

In one embodiment, the vehicle side VDR application may be a transient application. The application may be installed to the VCS 200 prior to a vehicle data recording. When the data collection is complete, the application may be automatically removed/deleted from the VCS 200. Instructions to remove the VDR application may be programmed to the VCS 200. By way of example and not limitation, a vehicle owner may install the vehicle-side VDR application prior to recording vehicle data (FIG. 6) using a portable memory device such as a USB drive. As long as the user continues to record vehicle data (e.g., for one week), the vehicle-side VDR application will remain in VCS 200 memory. Once the data recording is complete (and the USB drive removed), the application will be automatically removed. As another example, the application may be automatically uninstalled after a predetermined time. For example, where vehicle data recording is occurring wirelessly (e.g., over the Internet), the vehicle-side VDR application may be programmed or instructed to uninstall after a predetermined time (e.g., one week) of data recording. In some embodiments, a user may manually uninstall the vehicle-side VDR application through voice commands, a button press, a touch screen, or from the client terminal 104 (or other remote device in communication with the VCS 200).

In one embodiment, the client terminal 104 and the VCS 200 may bi-directionally communicate data over wireless communication (e.g., and without limitation, according to the 802.11 wireless standard (WiFi, WiMax, etc), BLUETOOTH, radio frequency (RF) transmission, cellular communication, Internet, etc.). As a non-limiting example, the configuration data file generated by the client side VDR application may be transmitted directly to the vehicle 102 via the wireless communication. Additionally or alternatively, the vehicle diagnostic data may be transmitted from the VCS 200 (where the vehicle diagnostic data is stored/buffered in VCS memory) to the client terminal 104 via wireless communication.

In other embodiments, the data communication between the client terminal 104 and the VCS 200 may also include both the portable memory device 110 and wireless communication. As a non-limiting example, data from the client terminal 104 may be transferred to the VCS 200 using a portable memory device 110 and data from the VCS 200 to the client terminal 104 may be transferred wirelessly.

In some embodiments, the system 100 may also include a server 106 communicating with the client terminal 104 and the vehicle 102. In one embodiment, the server 106 may operate as an intermediary for processing instructions and information exchanged between the client terminal 104 and the vehicle 102. For example, and without limitation, the server 106 may generate the configuration file(s) for transmission to the vehicle 102 and process the diagnostic data received from the vehicle 102 for transmission to the client terminal 104. The server 106 may identify the vehicle 102 based on a vehicle identifier (e.g., and without limitation a VIN) received from the client terminal 104. The vehicle identifier may be input by a user at the client terminal 104. In another embodiment, the vehicle identifier may be automatically transmitted (e.g., when the VDR application is activated and/or run at the client terminal 104). Furthermore, the client terminal 104 and the vehicle 102 may also include VDR applications. In one non-limiting embodiment, the respective applications may be in a client-server relationship with the server 106 application (not shown).

A vehicle information database 108 may include vehicle information such as diagnostic information about the vehicle. More specifically, database 108 may include diagnostic data definitions of the diagnostic data from the vehicle 102 (e.g., diagnostic trouble codes, i.e., DTC). It will be appreciated, however, that database 108 may include other vehicle related information. FIG. 25 provides some non-limiting examples of such diagnostic data definitions. As will be described in further detail below, the diagnostic data definitions may be displayed to a user at terminal 104. A user may include, but is not limited to, a vehicle owner, dealership, and/or a vehicle service shop. In one embodiment, the diagnostic data definition may be arranged according to vehicle identification numbers (VIN).

Database 108 may be in communication with server 106, or another server (not shown), in communication with terminal 104. Communication with terminal 104 may be accomplished using a wired (Ethernet, DSL, dial-up, etc.) and/or wireless (e.g., WiFi, WiMax, Internet) connection.

In one embodiment, the user may be required to provide authorization information (e.g., and without limitation, a username and password or other suitable login information) in order to access data from the vehicle information database 108. Accordingly, database 108 may be a secure database. The user authorization information may be provided by an OEM or other entity responsible for managing database 108. In some embodiments, the user authorization information may be given to the user when access subscription fees are paid by the user.

Figure 2:
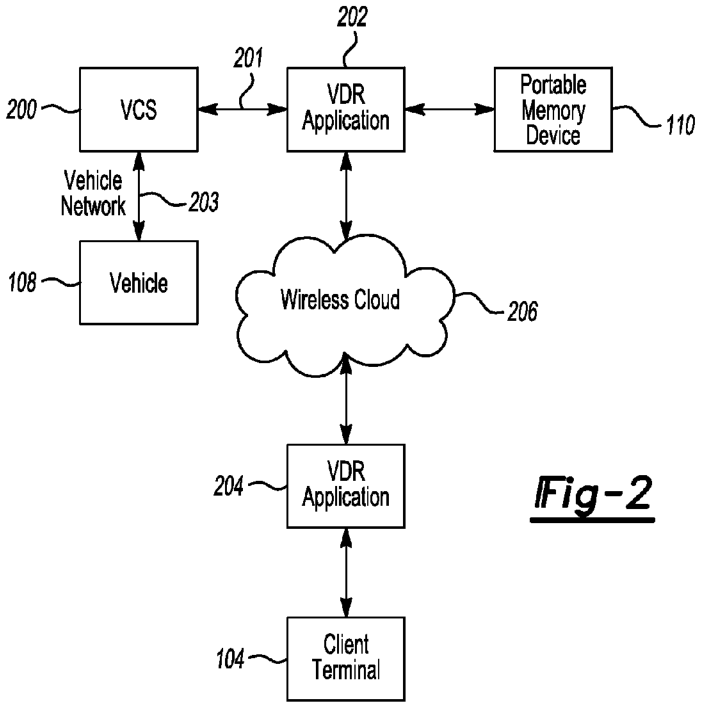
FIG. 2 illustrates a block diagram of the vehicle data recording system of FIG. 2 according to one of the various embodiments.

FIG. 2 is a block diagram of the vehicle data recording system for vehicle data recording. The VCS 200 is located in the vehicle 102. The VCS 200 may transmit requests for, and receive, diagnostic data from the vehicle 108 over a vehicle network 203 (e.g., CAN, GMLAN, J1850 or other suitable vehicle networks).

The vehicle side VDR application 202 may be installed onto the VCS 200. Installation of the VDR application 202 will be described in further detail below with respect to FIG. 6. In addition to the functions described above, the VDR application 202 may include instructions for understanding diagnostic identifiers (DIDs) and DTC requests and implementing the identifiers and DTC requests.

The client terminal 104 may include capabilities for generating a wireless connection with the VCS 200. In one embodiment, the client terminal 104 may include software such as a dynamic-link library (DLL) file. The wireless connection may be BLUETOOTH, 802.11 (i.e., WiFi or WiMax), or other non-limiting wireless connections. As described above, a client side VDR application 204 may be installed to the client terminal 104.

As described above, the data used by the applications 202, 204 may be exchanged via the VCS 200 and client terminal 104, respectively, via a portable memory device 110 such as USB. As will be described below with respect to FIG. 3, the VCS 200 may include one or more inputs or ports for receiving a portable memory device. With respect to the client terminal 104, it is well known that such devices include inputs or ports for receiving a portable memory device.

Additionally or alternatively, the data may be exchanged over a wireless connection 206. The wireless connection 206 may be (without limitation) BLUETOOTH, 802.11 (i.e., WiFi or WiMax), or other non-limiting wireless connections.

In one embodiment, embedded vehicle data recording may be performed in a testing environment. In this embodiment, the VCS 200 may be simulated from a testing terminal (such as, e.g., a testing kiosk). A vehicle network simulator may be installed to the testing terminal from a physical storage medium or downloaded to the testing terminal over a communication network (e.g., and without limitation, the Internet). The vehicle network simulator may simulate the vehicle network such as the powertrain control module (PCM), the anti-lock brakes (ABS), restraint control module (RCM) and other vehicle modules.

Figure 3:
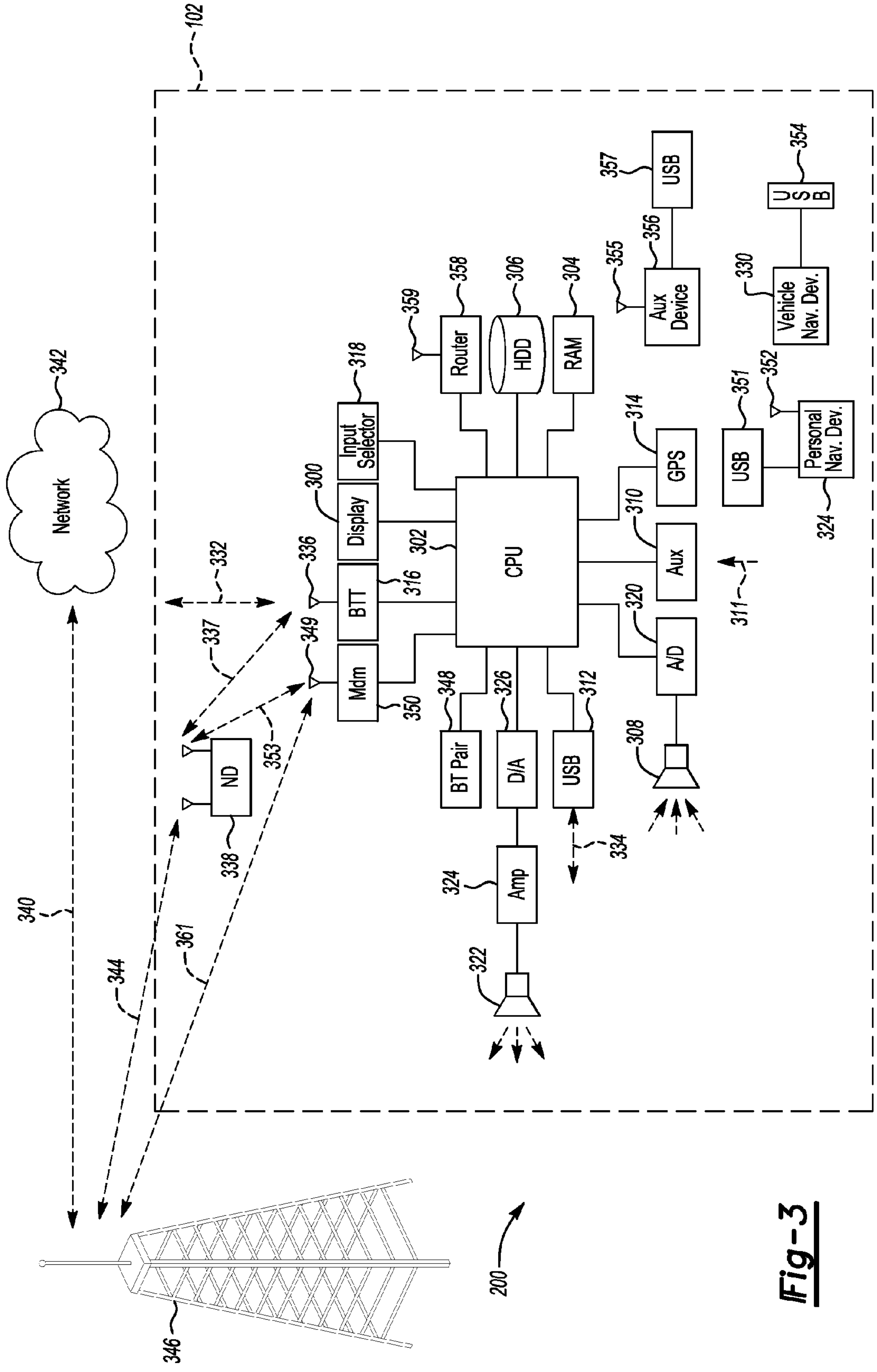
FIG. 3 illustrates a block topology of a vehicle computing system which comprises part of the vehicle data recording system.

FIG. 3 illustrates an example block topology for the VCS 200 for the vehicle 102. A vehicle enabled with a vehicle-based computing system may contain a visual front end interface 300 located in the vehicle. The user may also be able to interact with the interface if it is provided, for example, with a touch sensitive screen. In another illustrative embodiment, the interaction occurs through, button presses, audible speech and speech synthesis.

In the illustrative embodiment shown in FIG. 3, a processor 302 controls at least some portion of the operation of the VCS 200. Provided within the vehicle, the processor 302 allows onboard processing of commands and routines. Further, the processor 302 is connected to both non-persistent 304 and persistent storage 306. In this illustrative embodiment, the non-persistent storage 304 is random access memory (RAM) and the persistent storage 306 is a hard disk drive (HDD) or flash memory.

The processor 302 is also provided with a number of different inputs allowing the user to interface with the processor.

In this illustrative embodiment, a microphone 308, an auxiliary input 310 (for input 311), a USB input 312, a GPS input 314 and a BLUETOOTH input 316 are all provided. An input selector 318 is also provided, to allow a user to swap between various inputs. Input to both the microphone 308 and the auxiliary connector 310 is converted from analog to digital by a converter 320 before being passed to the processor.

Outputs to the system may include, but are not limited to, a visual display 300 and a speaker 322 or stereo system output. The speaker may be connected to an amplifier 324 and may receive its signal from the processor 300 through a digital-to-analog converter 326. Output can also be made to a remote BLUETOOTH device such as PND 328 or a USB device such as vehicle navigation device 330 along the bi-directional data streams shown at 332 and 334, respectively.

In one illustrative embodiment, the system 200 uses the BLUETOOTH transceiver 316 to communicate 336 with a user's nomadic device 338 (e.g., cell phone, smart phone, PDA, etc.). The nomadic device can then be used to communicate 340 with a network 342 outside the vehicle 102 through, for example, communication 344 with a cellular tower 346. In some embodiments, tower 346 may be a WiFi access point.

Exemplary communication between the nomadic device and the BLUETOOTH transceiver is represented by signal 337.

Pairing a nomadic device 338 and the BLUETOOTH transceiver 316 can be instructed through a button 348 or similar input. Accordingly, the CPU 302 is instructed that the onboard BLUETOOTH transceiver 316 will be paired with a BLUETOOTH transceiver in a nomadic device 338.

Data may be communicated between CPU 302 and network 342 utilizing, for example, a data-plan, data over voice, or DTMF tones associated with nomadic device 338. Alternatively, it may be desirable to include an onboard modem 350 having antenna 349 in order to communicate 353 data between CPU 302 and network 342 over the voice band. The nomadic device 338 can then be used to communicate 340 with a network 342 outside the vehicle 102 through, for example, communication 344 with a cellular tower 346. In some embodiments, the modem 350 may establish communication 361 with the tower 346 for communicating with network 342. As a non-limiting example, modem 350 may be a USB cellular modem and communication 361 may be cellular communication.

In one illustrative embodiment, the processor is provided with an operating system including an API to communicate with modem application software. The modem application software may access an embedded module or firmware on the BLUETOOTH transceiver 316 to complete wireless communication with a remote BLUETOOTH transceiver (such as that found in a nomadic device).

In another embodiment, nomadic device 338 includes a modem for voice band or broadband data communication. In the data-over-voice embodiment, a technique known as frequency division multiplexing may be implemented when the owner of the nomadic device 338 can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 338 may be replaced with a cellular communication device (e.g., and without limitation, modem 350) that is installed to vehicle 102. In yet another embodiment, the ND 338 may be a wireless local area network (LAN) device capable of communication over, for example (and without limitation), an 802.11g network (i.e., WiFi) or a WiMax network.

In one embodiment, incoming data can be passed through the nomadic device 338 via a data-over-voice or data-plan, through the onboard BLUETOOTH transceiver 336 and into the vehicle's internal processor 302. In the case of certain temporary data, for example, the data can be stored on the HDD 306 or other storage media until such time as the data is no longer needed.

Additional sources that may interface with the VCS 200 include a personal navigation device 328, having, for example, a USB connection 351 and/or an antenna 352, a vehicle navigation device 330, having a USB 354 or other connection, an onboard GPS device 314, or a remote navigation system (not shown) having connectivity to network 342.

Further, the CPU may be in communication with a variety of other auxiliary devices 356. These devices can be connected through a wireless 355 or wired 357 connection (such as a USB connection). Also, or alternatively, the CPU 302 may be connected to a vehicle based wireless router 358, using for example a WiFi transceiver 359. This could allow the CPU to connect to remote networks in range of the local router 358.

FIG. 4 illustrates one aspect of the embedded vehicle data recording operation. More specifically, FIG. 4 illustrates the operation at the client terminal 104. It will be appreciated that the disclosure and arrangement of FIG. 4 may be modified or re-arranged to best fit a particular implementation of the various embodiments of the invention. FIG. 4 will be described below with respect to FIGS. 9-15.

Further, it should be understood that inputs received from the user, as described in FIG. 4 and below, may be received by the VDR application upon selection of an input button by the user. For example, and without limitation, the user may select a "submit" button (as represented by button 500 of FIGS. 9-15). Unless otherwise noted below, the information may be input using button 500. Once submitted, the information may be stored in memory on a memory or storage device (e.g., and without limitation, the portable memory device 110, the terminal 102, and/or server 106). Additionally or alternatively, the information may be buffered until the configuration information is to be transmitted to the VCS 200.

In one embodiment, the information may be stored in memory and/or buffered after each input. In an alternative embodiment, the information may be stored and/or buffered after all of the configuration information is selected. In yet another embodiment, the information may be stored and/or buffered at predetermined intervals (e.g., based on time or after a threshold level of configuration information is collected).

Referring now to FIG. 4, as illustrated in block 400, the client side VDR application 204 may be installed at terminal 104. The VDR application may be installed to terminal 204 prior to or upon first use. After installation, the VDR application 204 may be activated and run from terminal 104 using suitable methods known in the art.

Figure 9:
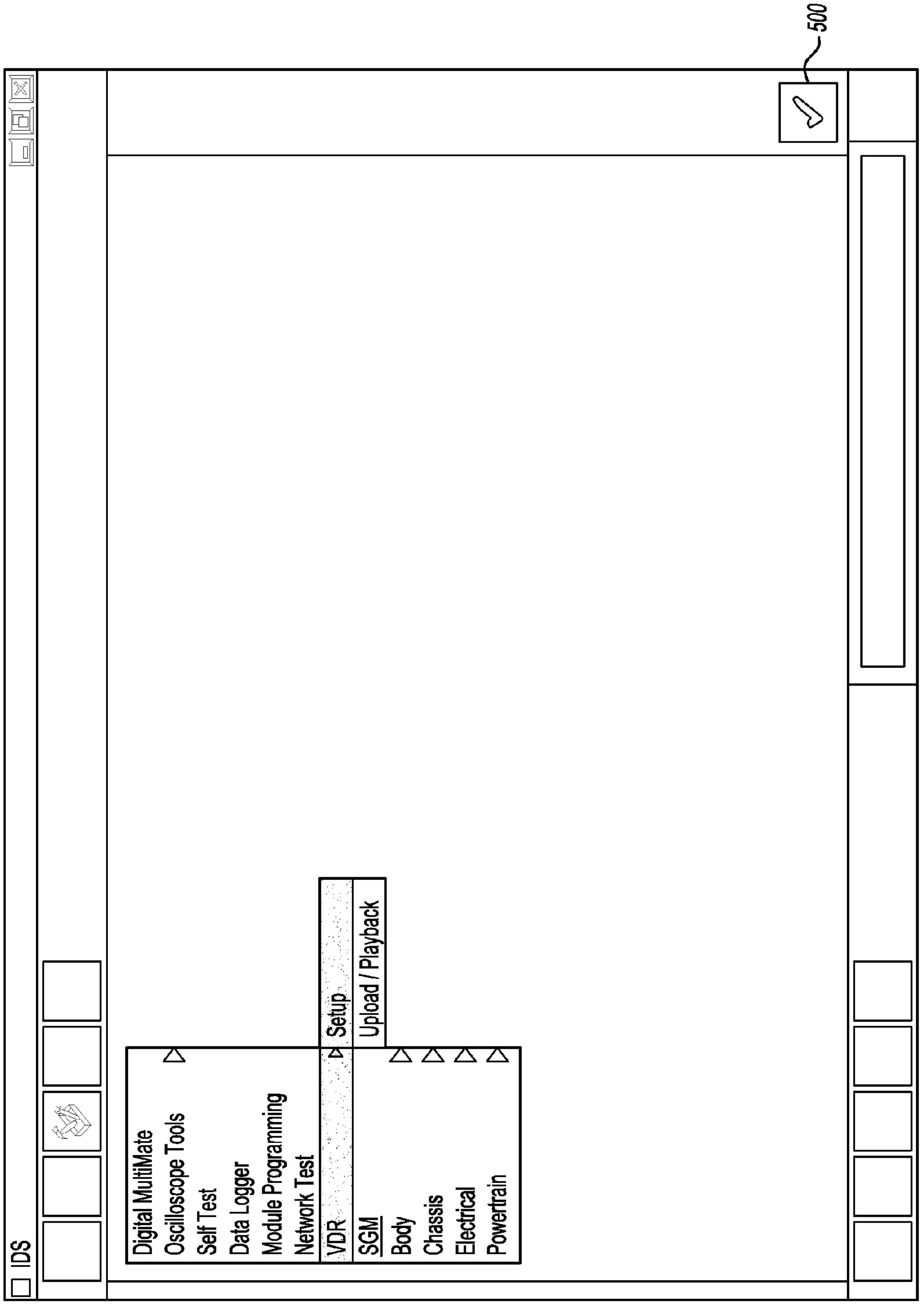
FIGS. 9-16 are illustrative screenshots displayed as part of the operation of FIG. 5.

As illustrated in block 402, the configuration function of the VDR application may be activated or run from terminal 104. Activation may be accomplished using suitable methods known in the art including, but not limited to, selection (e.g., "double click) of a graphical user interface (GUI) icon, voice activation, and selection from a menu. FIG. 9 illustrates a non-limiting example of GUI displayed to a user when activating the configuration function of the VDR application.

Figure 10:
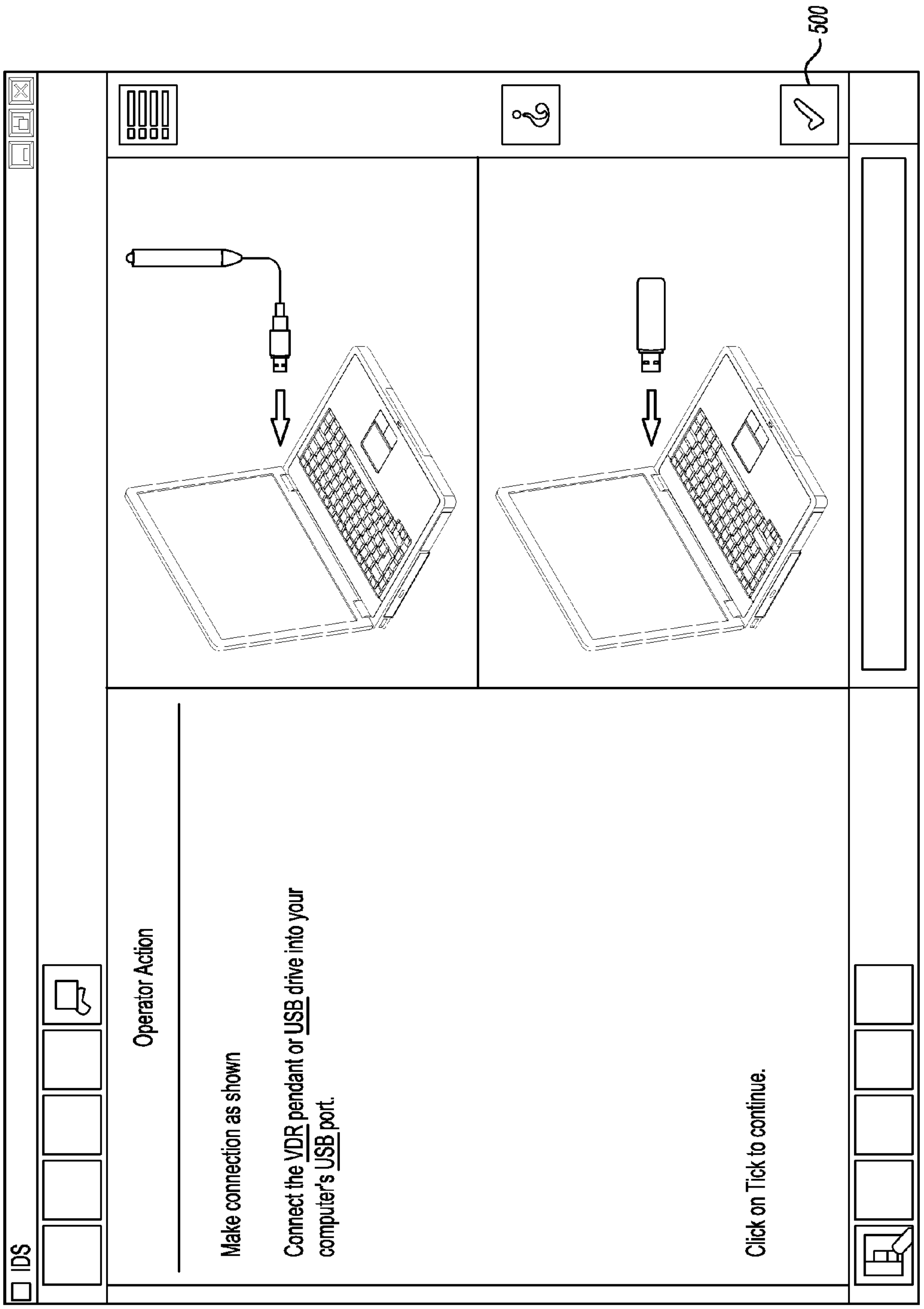

A determination may be made, as illustrated in decision block 404, as to the manner in which the data will be exchanged between the terminal 104 and the VCS 200. FIG. 10 illustrates a non-limiting example of a GUI displayed to a user when a wired connection is used. In one embodiment, the user may select (via, e.g., a click of a hyperlink or selection of a command button) whether wireless or wired communication will be used. Where wired communication is used, the user may be presented with instruction on connecting the wired device. As a non-limiting example, the instructions may state that the pendant (illustrated in the top frame of FIG. 10) be plugged into the terminal 104 using the input (e.g., and without limitation, a USB input) at one end of the pendant to plug into a port (e.g., and without limitation, a USB port) on the terminal 104. It will be appreciated that other wired devices may be utilized (e.g., and without limitation, a USB thumbdrive).

When the wired portable memory device 110 is connected, the terminal 104 may search for the memory device 110 in manners known in the art. A connection may be established with the portable memory device 110 as illustrated in block 406. As such, data may be exchanged between the terminal 104 and the vehicle (via the VCS 200) via the portable memory device 110.

If there is no portable memory device 110 connected to the terminal 104, data may be exchange wirelessly. It should be understood that the determination between wired or wireless transport made in block 404, as illustrated in FIG. 4, should not be interpreted as a default determination made by VDR application 200. Rather, the arrangement of FIG. 4 is for illustration and explanation.

In one embodiment, the data may be exchanged via two or more data transport types. As a non-limiting example, the data may be exchanged using USB (e.g., from the terminal 104 to the VCS 200) and WiFi (from the VCS 200 to the terminal 104). Accordingly, the manner in which data is transported may be determined at the terminal 104 and at the VCS 200.

Figure 11:
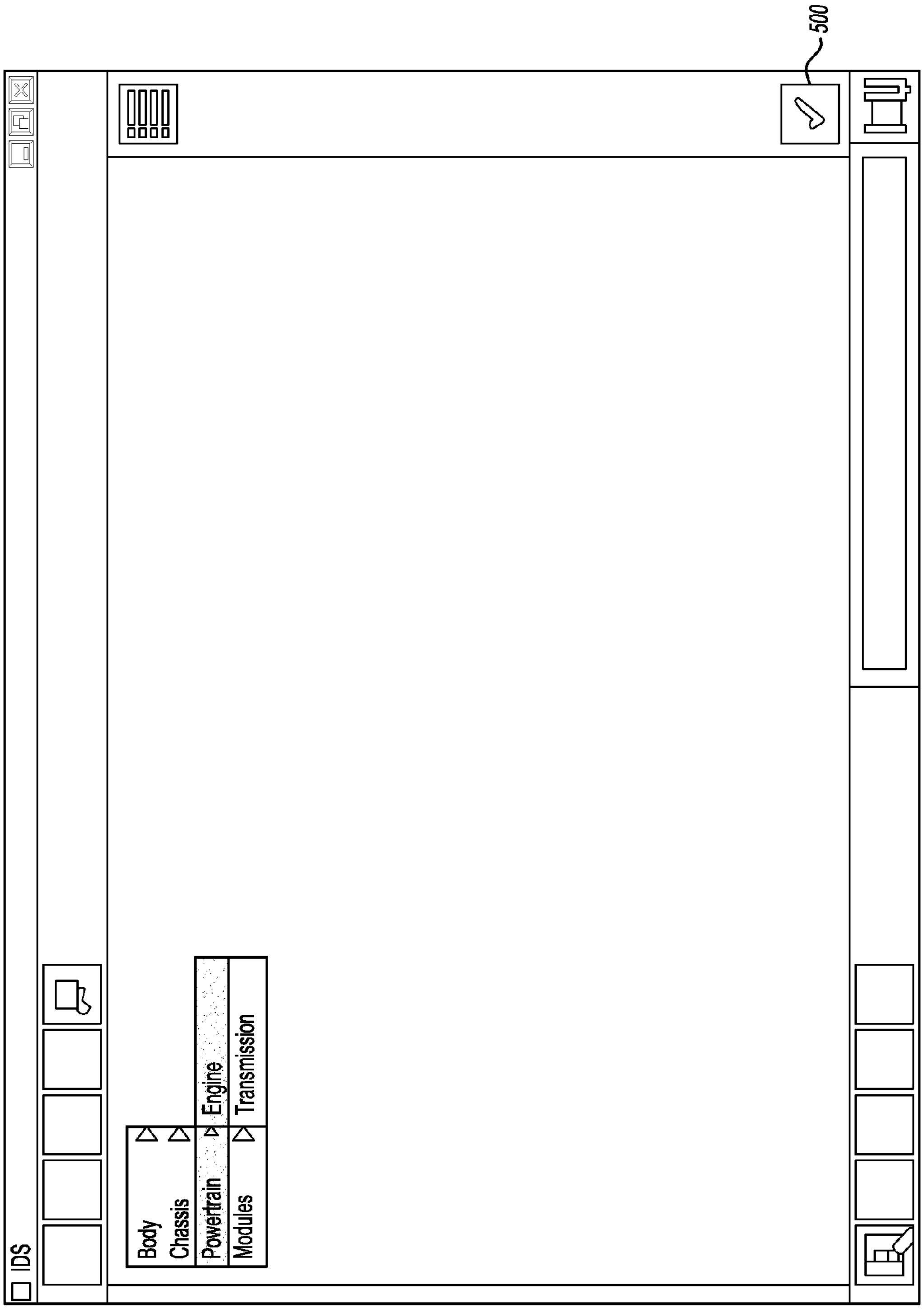

As illustrated in block 408, the vehicle module from which to record diagnostic data may be selected by a user and received by the VDR application 204. FIG. 11 illustrates a non-limiting example of a GUI presented to a user for selecting the vehicle module.

Figure 12:
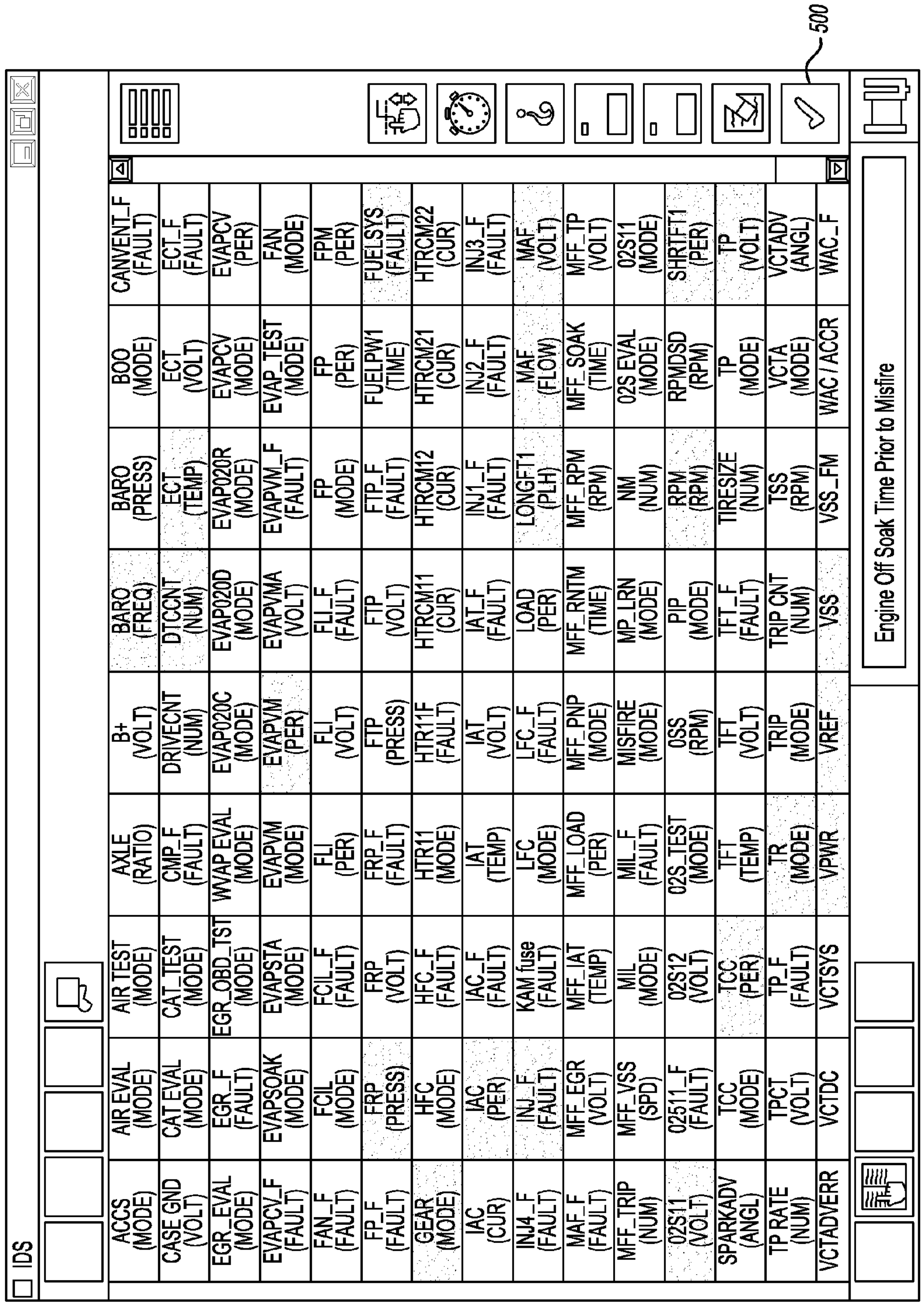

As illustrated in blocks 410, 412, 414 and 416, the data recording parameters may be configured. The data recording parameters may be received based on, and in response to, parameter selection(s) by the user. As illustrated in block 410, the vehicle parameter(s) may include the vehicle modules from which to record data (e.g., and without limitation, powertrain control module (PCM), the anti-lock brakes (ABS), restraint control module (RCM), engine control unit (ECU), vehicle control module (VCM), etc.). In one embodiment, the vehicle parameter(s) may also include the unit(s) to measure for the diagnostics. FIG. 12 illustrates a non-limiting example of a GUI presented to the user for selecting these vehicle parameters. In this example, the vehicle parameters pertain to the vehicle engine based on the vehicle component selected by the user to be diagnosed (as shown in FIG. 11).

Figure 13:
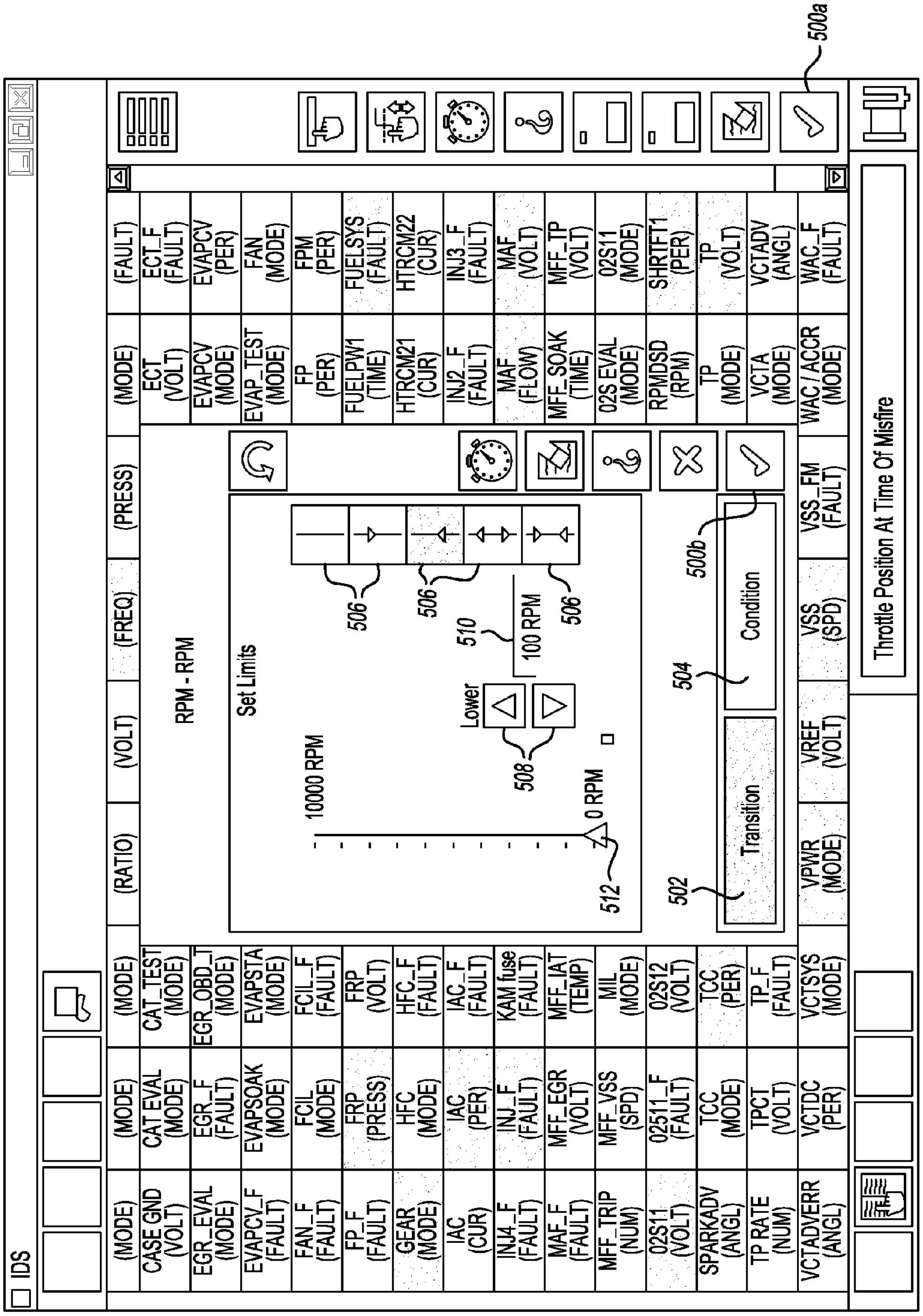

Other parameters may also be configured. As illustrated in block 412, a determination may be made whether a data recording automatic trigger has been set up. If so, the automatic trigger recording configuration is received based on information input by the user as illustrated in block 414. FIG. 13 is a non-limiting example of a GUI presented to a user for inputting automatic trigger configuration information. Inputs 502 and 504 may define when a vehicle module will cause a trigger to occur. As a non-limiting example, if a user selects input 502 (referred to in FIG. 13 as "Transition"), a recording may be triggered if a vehicle module operating under normal conditions (i.e., in a "good state"), transitions to a failure condition (i.e., a "bad state"). In this scenario, if a vehicle module is always in a bad state the system may never trigger a recording. Additionally or alternatively, a user may select input 504 (referred to in FIG. 13 as "Condition"). In this case, if the vehicle module is always in a bad state (e.g., hard fault) a trigger may be activated a predetermined number of times (e.g., once). Subsequent triggers may be a transition type trigger in which the trigger may be disabled until the vehicle module transitions to a good state and back again to a bad state. It will be appreciated that the labels given for inputs 502 and 504 are non-limiting and provided for illustration and clarity.

Inputs 506 may permit a user to set the bounds of the trigger limits. In one non-limiting embodiment (as illustrated in FIG. 13), there may be four choices: upper bound, lower bound, in between bounds, and outside of bounds. A fifth button may clear the limit bounds.

Input 508 may be an input utilized to set the value(s) of the trigger limit (as shown in box 510). Additionally or alternatively, input 512 may be a slider control to set the value of the trigger limit.

The parameters input by the user from the autotrigger recording configuration GUI indicate which parameters must be satisfied for vehicle data to be automatically recorded. As a non-limiting example, as illustrated in FIG. 13, once the engine reaches 400 revolutions per minute (RPM) (i.e., the trigger) (box 510), data recording will automatically commence. The configuration information may be submitted by selecting button 500*b*.

Figure 14:
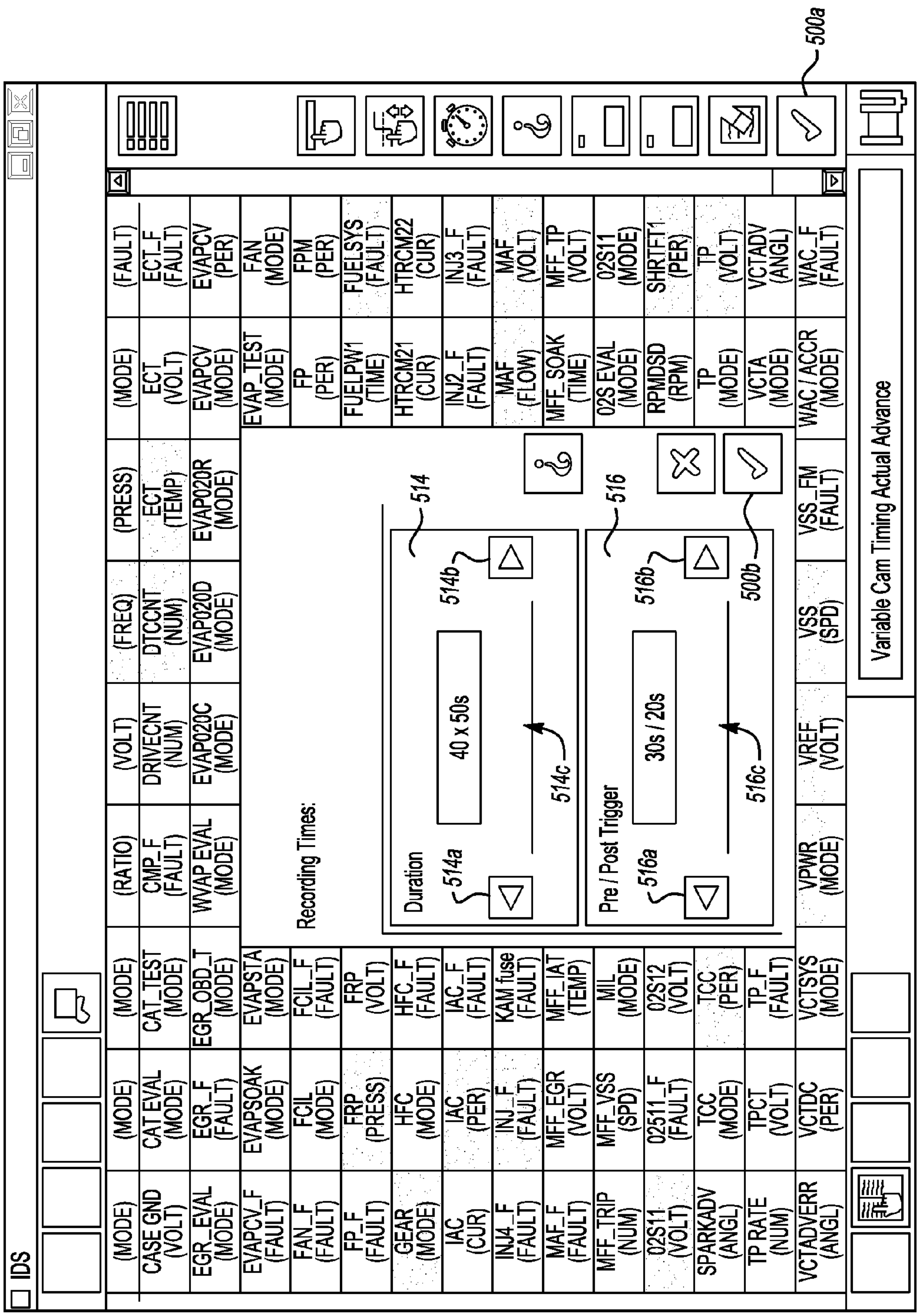

Whether or not the autotrigger has been configured, the user may input timer configuration information (block 416). The user may manually trigger data recording, but recording time information may still be received as input by the user (block 416). FIG. 14 illustrates a non-limiting example of a GUI that is presented to a user for inputting recording timer configuration information.

Non-limiting examples of triggers (manual and automatic) include message based (e.g., signal value, fault code, etc.), time-based, physical triggers (e.g., button press), voice command, location-based, vehicle state (e.g., start up), and remote triggers. Remote triggers may be wired and/or wireless. Non-limiting examples of remote triggers may include triggers from devices that are in wireless communication with the VCS 200 and capable of communicating with the vehicle-side VDR application including, but not limited to, terminal 104 (as described above) and hardware devices such as (without limitation) wireless push buttons.

As illustrated in FIG. 14, a recording duration may be established (box 514). The user may establish the number of recordings to be made (e.g., and without limitation, 4 recordings) and/or the length of the recording (e.g., and without limitation, 50 seconds for each recording). The user may configure the duration using one or more of buttons 514*a*, 514*b* and/or a sliding graphic as represented by icon 514*c*. In one embodiment, this configuration may be represented as "4×50s" as illustrated in box 514.

A pre/post trigger timer may also be configured as illustrated in box 516. The pre/post trigger timer may indicate the duration for recording the vehicle data pre-trigger and post-trigger. The user may configure the pre/post trigger timer using one or more of buttons 516*a*, 516*b* and/or a sliding graphic as represented by icon 516*c*. In one embodiment, this configuration may be represented as "30s/20s" as illustrated in box 516.

Upon entering the parameters, the user may submit the configuration information by selecting button 500*b*.

Figure 15:
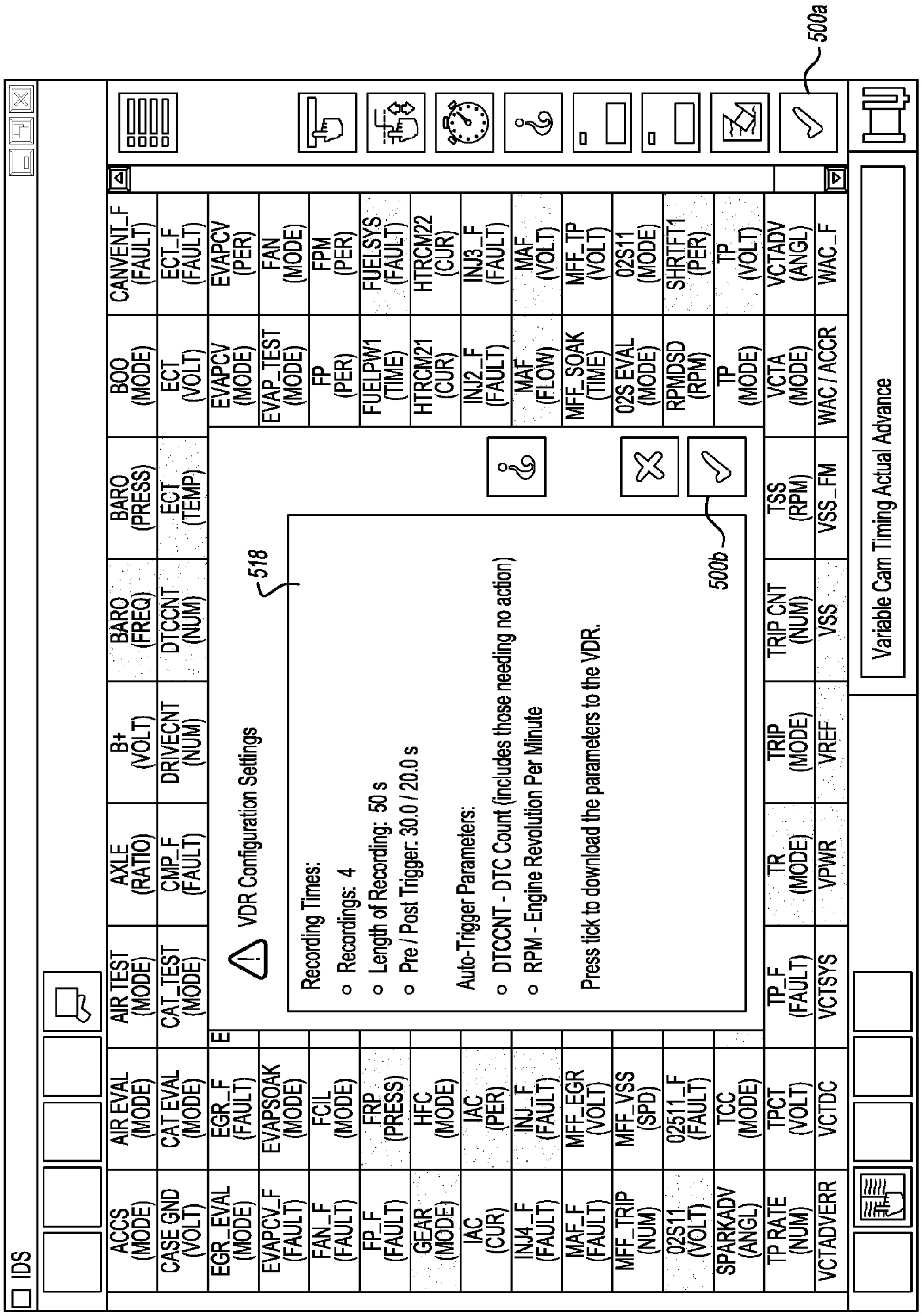

Referring back to FIG. 4, a configuration file (i.e., a script) may be generated by the VDR application 202 as illustrated in block 418. This file may be uploaded to the VCS 200 (via wired or wireless communication) for use by the vehicle 102 in recording vehicle data. FIG. 15 is a non-limiting example of GUI presented to a user for generating the configuration file/script. In one embodiment, a confirmation screen (box 518) may be presented to the user including at least some of the configuration information. In this non-limiting example, the user is presented with the configured recording times and the autotrigger parameters. Upon selection of button 500*b* by a user, the configuration file/script may be generated.

As illustrated in block 420, the configuration file/script may be transmitted to and stored in memory of a memory device (e.g., the terminal 104 or the portable memory device 110).

Figure 5:
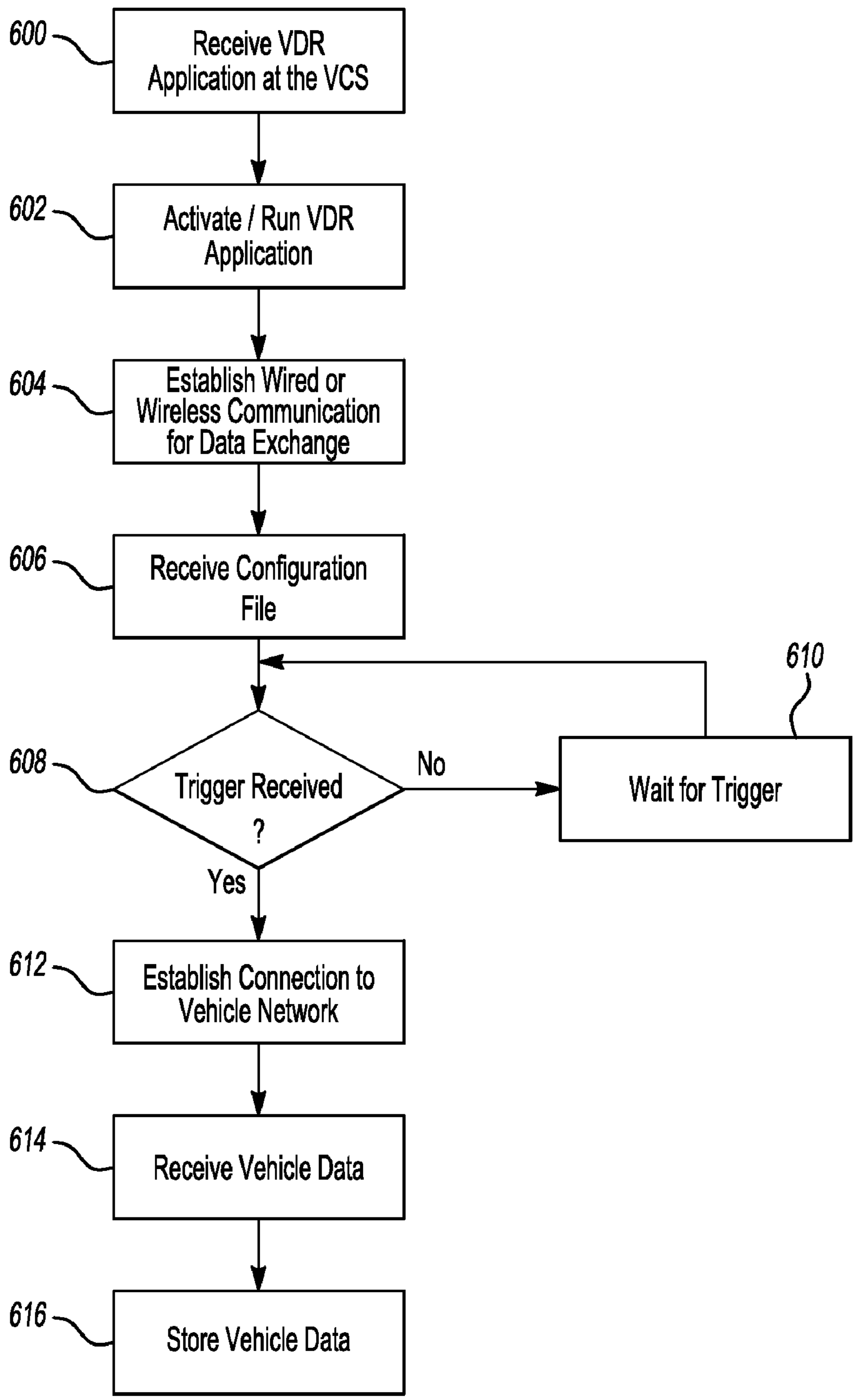
FIG. 5 illustrates an operation for recording vehicle data.

FIG. 5 illustrates the operation of another aspect of the embedded vehicle data recording system. More specifically, FIG. 5 illustrates the operation at the VCS 200. It will be appreciated that the disclosure and arrangement of FIG. 5 may be modified or re-arranged to best fit a particular implementation of the various embodiments of the invention. Certain aspects of FIG. 5 will be described below with respect to FIG. 6 and FIG. 16.

As illustrated in block 600, the vehicle side VDR application 202 may be installed at VCS 200. The VDR application 202 may be installed to VCS 200 prior to or upon first use. In other embodiments, as described above, the installation may occur with each instance of a vehicle data recording.

Figure 6:
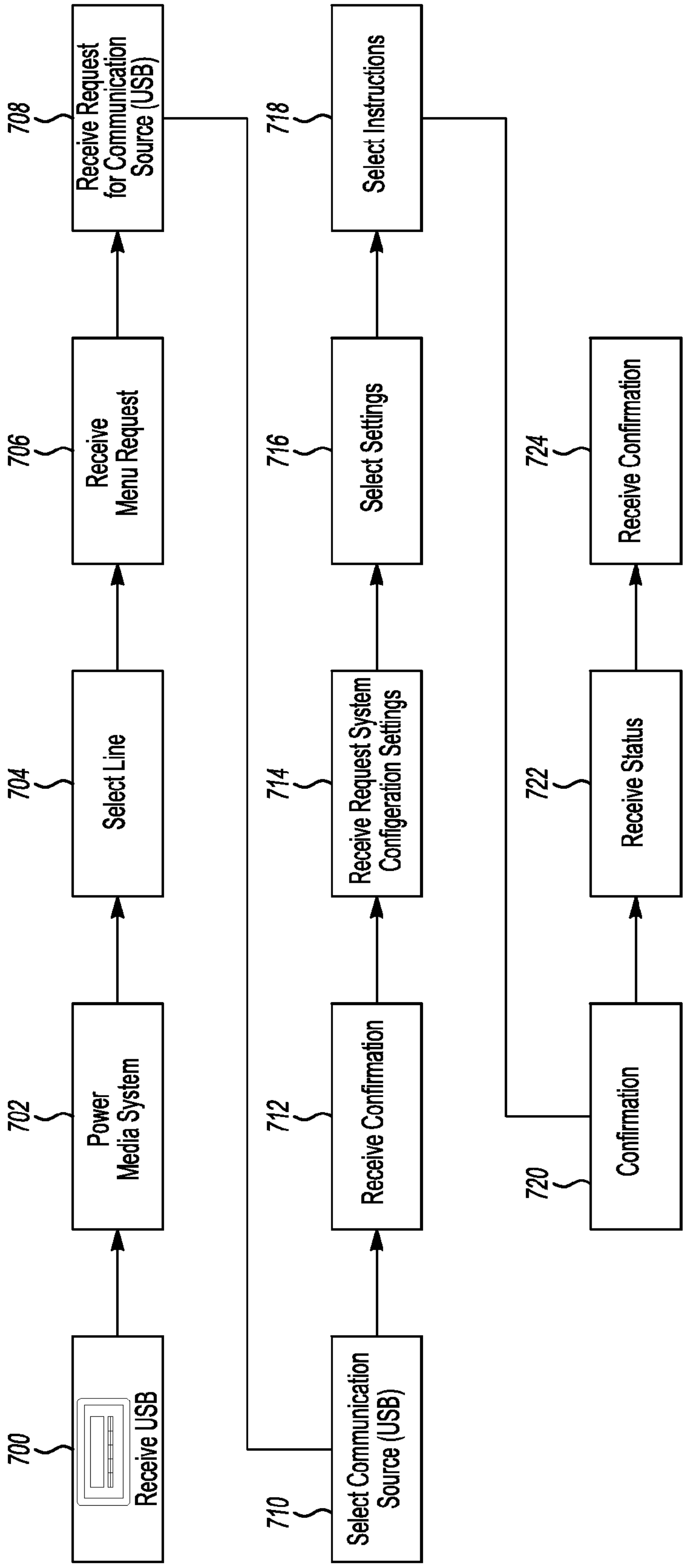
FIG. 6 illustrates the operation of installing a vehicle data recording application to the vehicle computing system of FIG. 3.

FIG. 6 illustrates one non-limiting way of installing the vehicle side VDR application. The vehicle side VDR application may be installed to the VCS 200 using a physical storage medium (e.g., a USB). It should be understood, however, that other non-limiting installation tools (wired and/or wireless) may be used as described above. Accordingly, the arrangement and description of FIG. 6 is presented for illustration purposes.

As illustrated in block 700, the USB device may be received by USB port 312. The VCS 200 may be powered (unless it is already powered) as illustrated in block 702. As illustrated in block 704, the media line may be selected. One or more menu requests may be received such as, in this example, "Play Menu" (block 706).

User selections, as described below, may be accomplished using one or more of a rotation dial and/or button(s) on the VCS 200. In one embodiment, selections may be accomplished using voice commands. Alternatively or additionally, selection may be made using button on the steering wheel or in the center stack.

A media source request may be received as illustrated in block 708. In this example, the media source is USB (block 710). A confirmation may be displayed to the user confirming the media source selection (block 712).

As illustrated in block 714, a request to modify/configure system setting may be received from the user. The user may select different levels of settings to modify/configure. In this non-limiting example, the user may select an advance setting to install the VDR application (block 716).

The VCS 200 may receive instructions from the user to install applications as illustrated in block 718. In one embodiment, a confirmation screen for the instruction (e.g., and without limitation, "install application?") may be output (e.g., displayed on display 300 and/or output from speaker 322) to the user (block 720).

Upon receiving installation instructions, the VCS 200 may install the VDR application (which may be stored on the USB). During installation, an installation status message may be output to the user (block 722). When installation is completed, a completion status message may be output to the user (block 724).

Referring back to FIG. 5, the VDR application may be activated or run from VCS 200 (block 602). Activation may be accomplished using suitable methods known in the art including, but not limited to, selection of a graphical user interface (GUI) icon, voice activation, and selection from a menu.

As illustrated in block 604, wired or wireless communication may be established for accomplishing data exchange between the terminal 104 and VCS 200. With respect to the wired communication, in one embodiment, the wired communication may be established when the wired component (e.g., a USB) is input to a corresponding port on the VCS 200. With respect to the wireless communication, as described above, a wireless connection may be established through a user input request (e.g., and without limitation, a voice based request or one or more button presses) on the VCS 200. In a further embodiment, the wireless communication may be an automatic connection.

As illustrated in block 606, the configuration file/script may be received or retrieved over the wired or wireless connection and stored in the VCS 200 memory. In one embodiment, the configuration file/script may be read by the VDR application 202 from the memory device without downloading to the VCS 200.

The VDR application 202 may instruct the VCS 200 to establish a connection with the vehicle network (block 612). In some embodiments, the connection to the vehicle network may be a perpetual connection. The vehicle data may be received via the vehicle network (block 614).

In one embodiment, the pre-trigger vehicle data may be received over the vehicle network (block 610). The pre-trigger data may include vehicle diagnostic data prior to the trigger. As described above, this trigger may be configured by a user. In other embodiments, the pre-trigger may be a predetermined time period programmed to the vehicle-side VDR application (e.g., and without limitation, 20 seconds prior to receiving the trigger). The pre-trigger data may be stored/buffered in local memory (e.g., at the VCS). In one embodiment, when the trigger is activated, the pre-trigger vehicle data may be output from storage/buffer according to a first-in-first-out (FIFO) basis from the VCS 200. It should be understood that other buffering priorities/patterns maybe used without departing from the scope of the invention.

Figure 16:
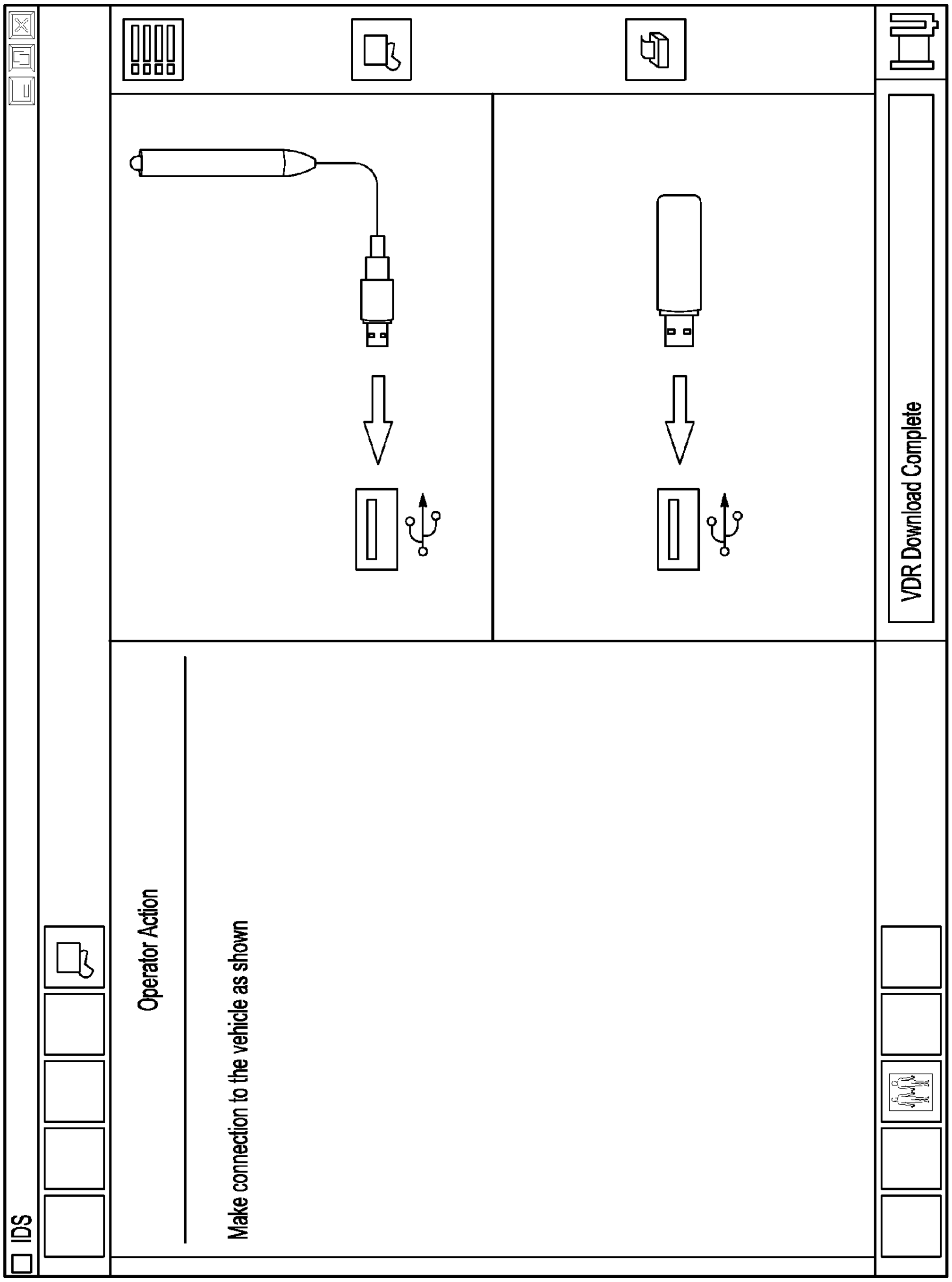

The VDR application 202 may determine if a manual (e.g., activated by the user) or automatic recording trigger has been received (block 612). A user may manually trigger data recording by using, for example, a USB VDR pendant having a trigger button. A non-limiting example of such a device is illustrated in FIG. 16 (right, top frame). The pendant may be plugged into a port (e.g., and without limitation, a USB port) of the VCS 200 using an input (e.g., and without limitation, a USB input) at one end of the pendant.

In other non-limiting examples, a trigger may be manually activated using one or more vehicle controls. Non-limiting examples of such vehicle controls include one or more buttons on a steering wheel, buttons on the vehicle's center stack, a touchscreen interface, and/or voice commands. The activation of the automatic trigger may be configured at terminal 104 as described above with respect to FIG. 4.

If a trigger has not been received, the VDR application 202 may wait for the trigger (block 610) to be received prior to further action. If the trigger has been received, the VDR application 202 may receive the vehicle data (block 614). In one embodiment, this vehicle data may be the post-trigger vehicle data.

During or after receipt of the vehicle data, the vehicle data may be stored (block 616). In one embodiment, raw vehicle data (e.g., raw DTCs) may be stored. The data may be stored in local memory (e.g., at the VCS) or remote memory (e.g., on the memory device).

Figure 7:
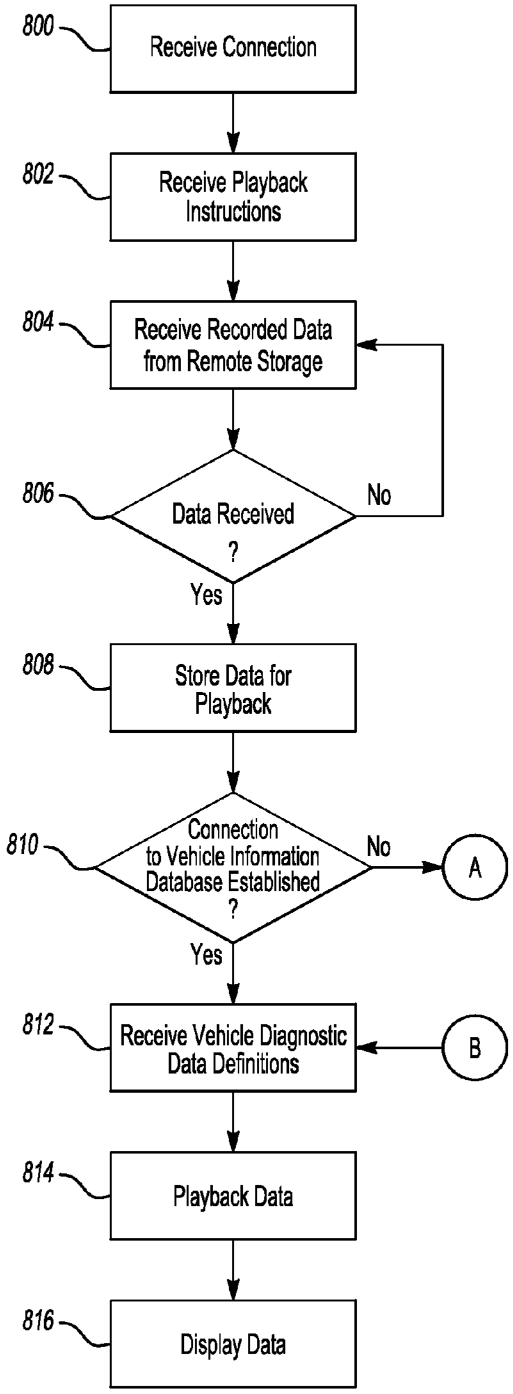
FIG. 7 illustrates an operation for vehicle data playback.

FIG. 7 illustrates another aspect of the vehicle data recording operation. More specifically, FIG. 7 illustrates one non-limiting process for playback of recorded vehicle data. It will be appreciated that the disclosure and arrangement of FIG. 7 may be modified or re-arranged to best fit a particular implementation of the various embodiments of the invention. FIG. 7 will be described below with respect to FIGS. 17-22.

Further, it should be understood that inputs received from the user, as described in FIG. 7 and below, may be received by the VDR application upon selection of an input button by the user. For example, and without limitation, the user may select a "submit" button (as represented by button 900 of FIG. 17-22). Unless otherwise noted below, the information may be input using button 900.

As illustrated in block 800, a wired or wireless connection may be established for receiving the recorded vehicle data. The wired connection may be established by the user inputting a wired device into one or more ports of terminal 104. The wireless connection may or may not already exist. If not, the wireless connection may be established with the vehicle in a manner as described above.

Figure 17:
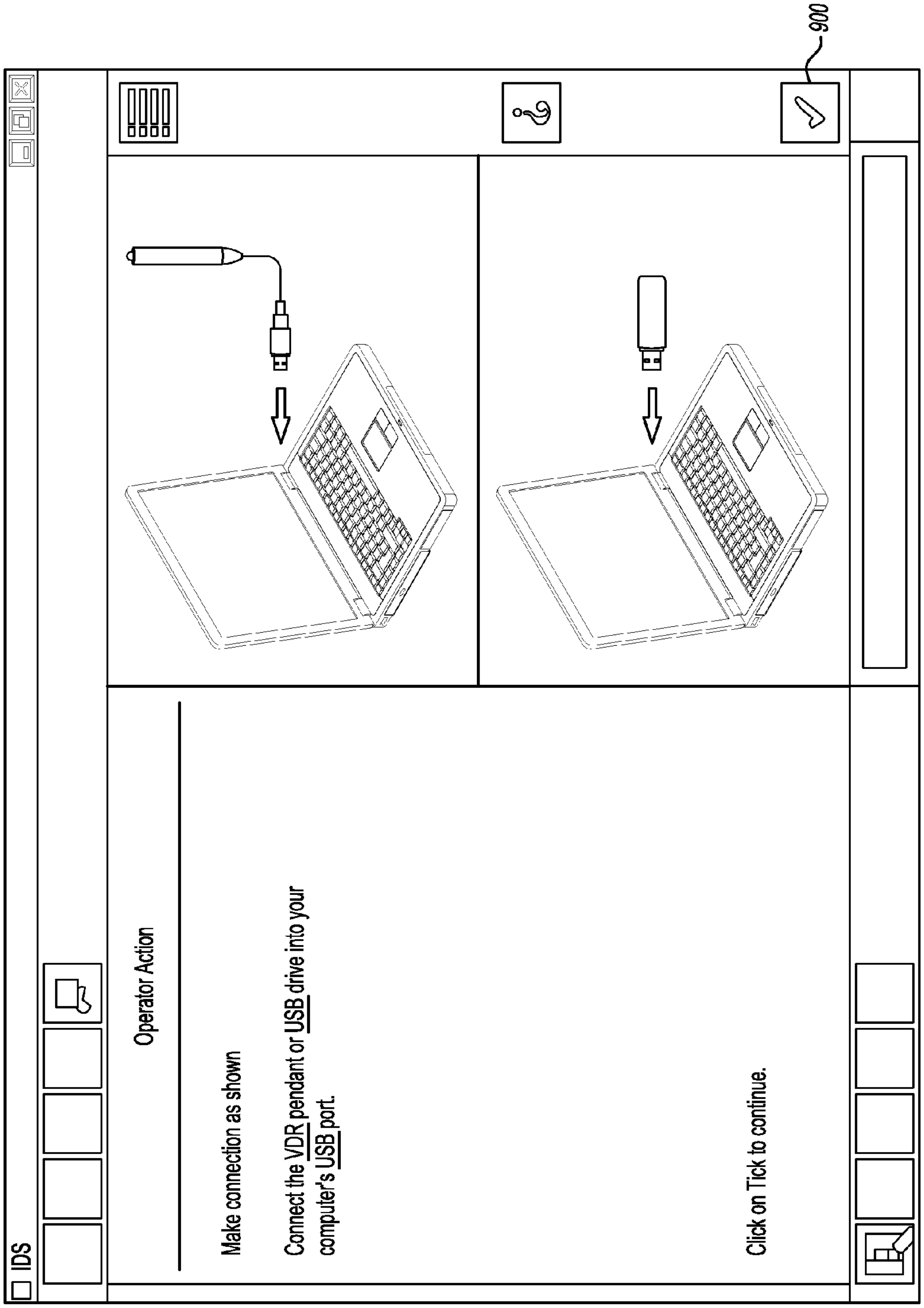
FIGS. 17-22 are illustrative screenshots displayed as part of the operation of FIG. 7.

A non-limiting example of wired connection is illustrated in FIG. 17. Although FIG. 17 illustrates a wired connection with a VDR pendant or a USB drive, it should be understood that other portable memory devices may be used.

Figure 18:
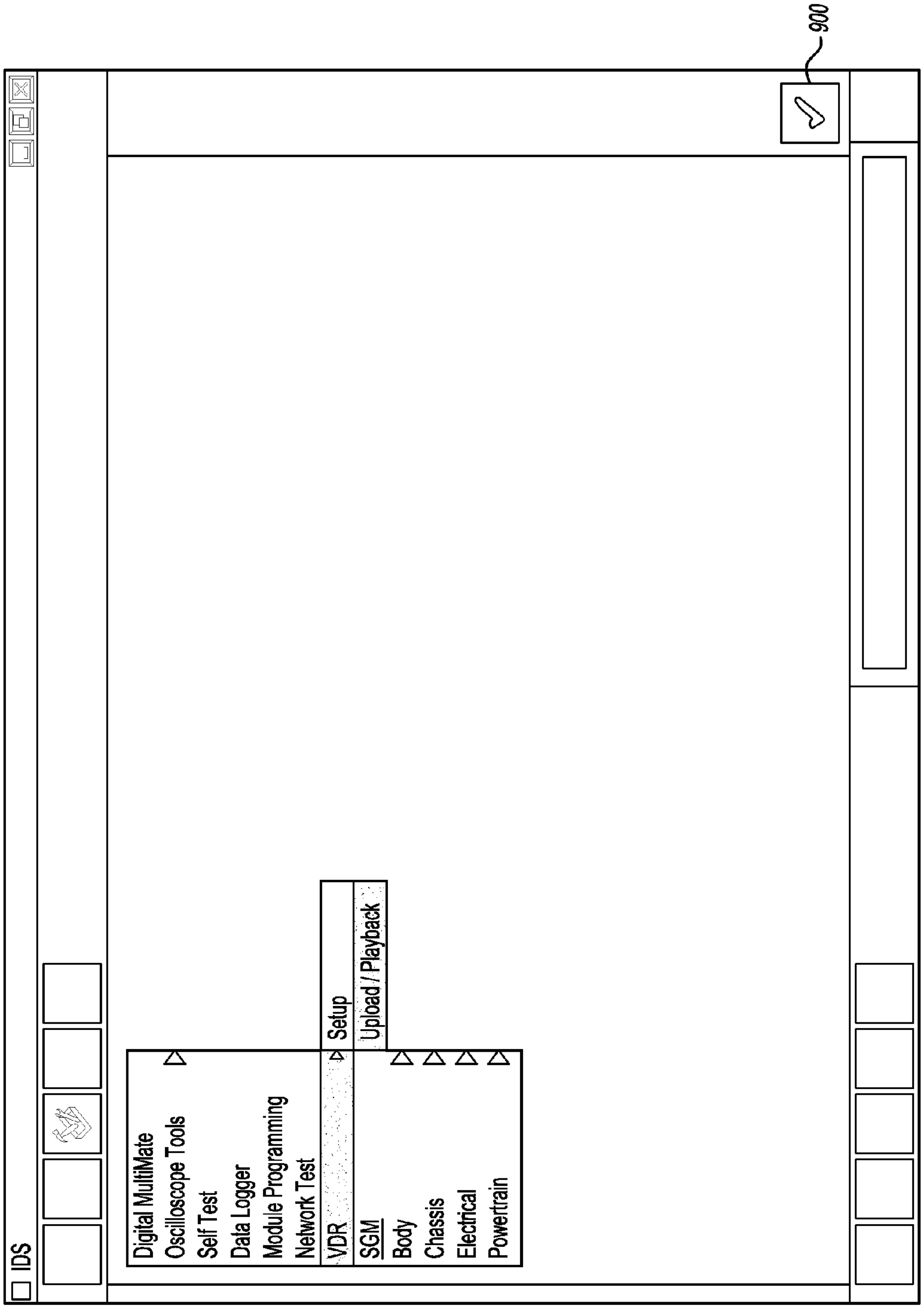

A user may input instructions to the VDR application 202 to playback the recorded data (block 802). FIG. 18 illustrates a non-limiting example of a GUI presented to a user for inputting playback instructions. It should be understood, however, that activation may be accomplished using other suitable methods known in the art including, but not limited to, selection (e.g., "double click) of a graphical user interface (GUI) icon and voice activation. Further, in some embodiment, playback activation may be automatic.

Figure 19:
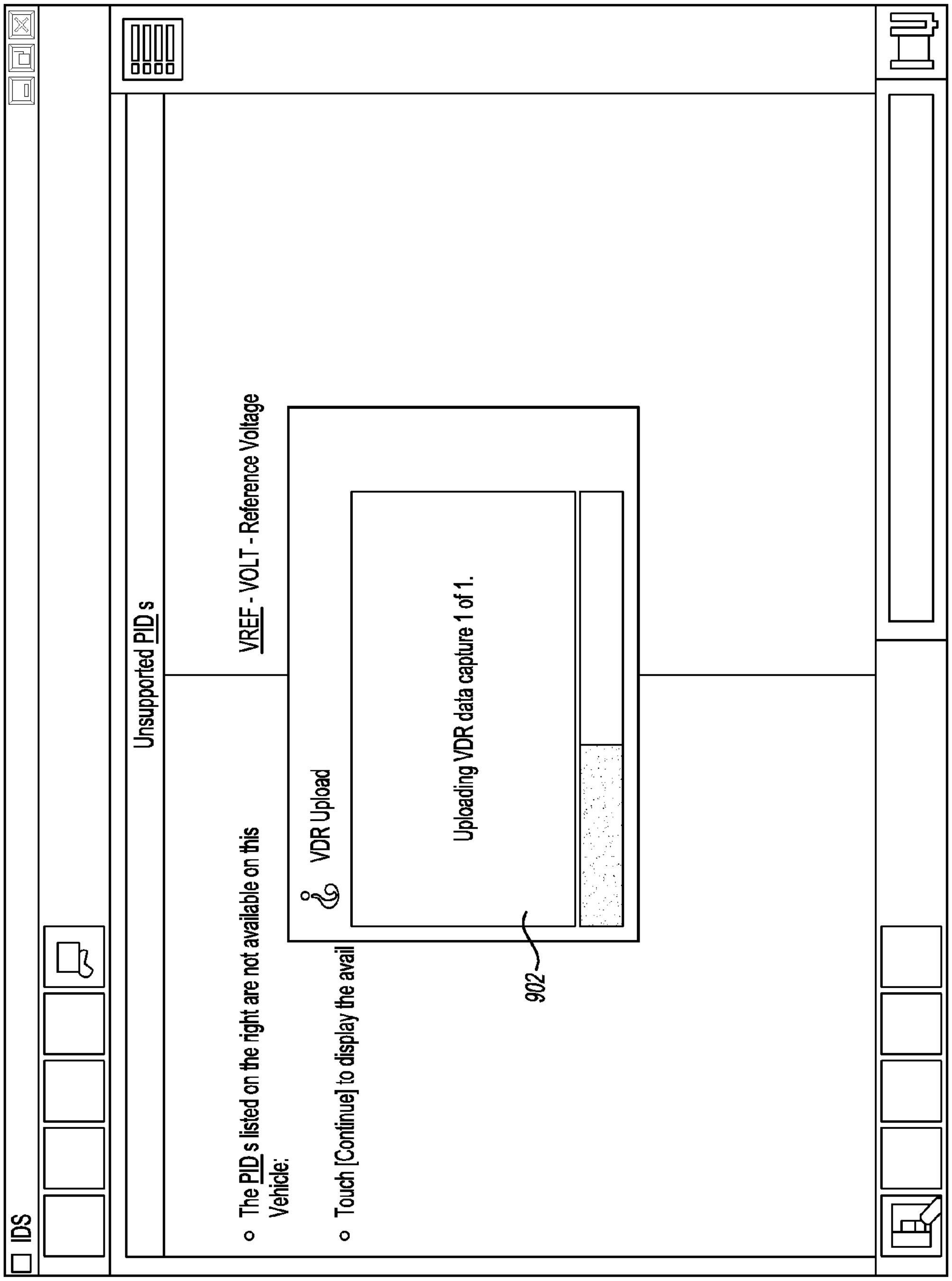

Upon receiving the playback instructions, the recorded vehicle data may be received (uploaded) from memory of the storage device (block 804). FIG. 19 illustrates a non-limiting example of a GUI presented to a user during data retrieval/upload. In one embodiment, a status screen 902 may be presented to the user during data retrieval.

During data retrieval, the VDR application 204 may monitor the data retrieval to determine if all the data has been received (block 806). If not, the VDR application 204 may continue to monitor the process. If the data has been received, the data may be stored in the terminal's 104 local memory as illustrated in block 808.

In some embodiments, the vehicle data may already be stored in the terminal's 104 memory. As a non-limiting example, where there is a wireless data exchange between terminal 104 and VCS 200.

Figure 20:
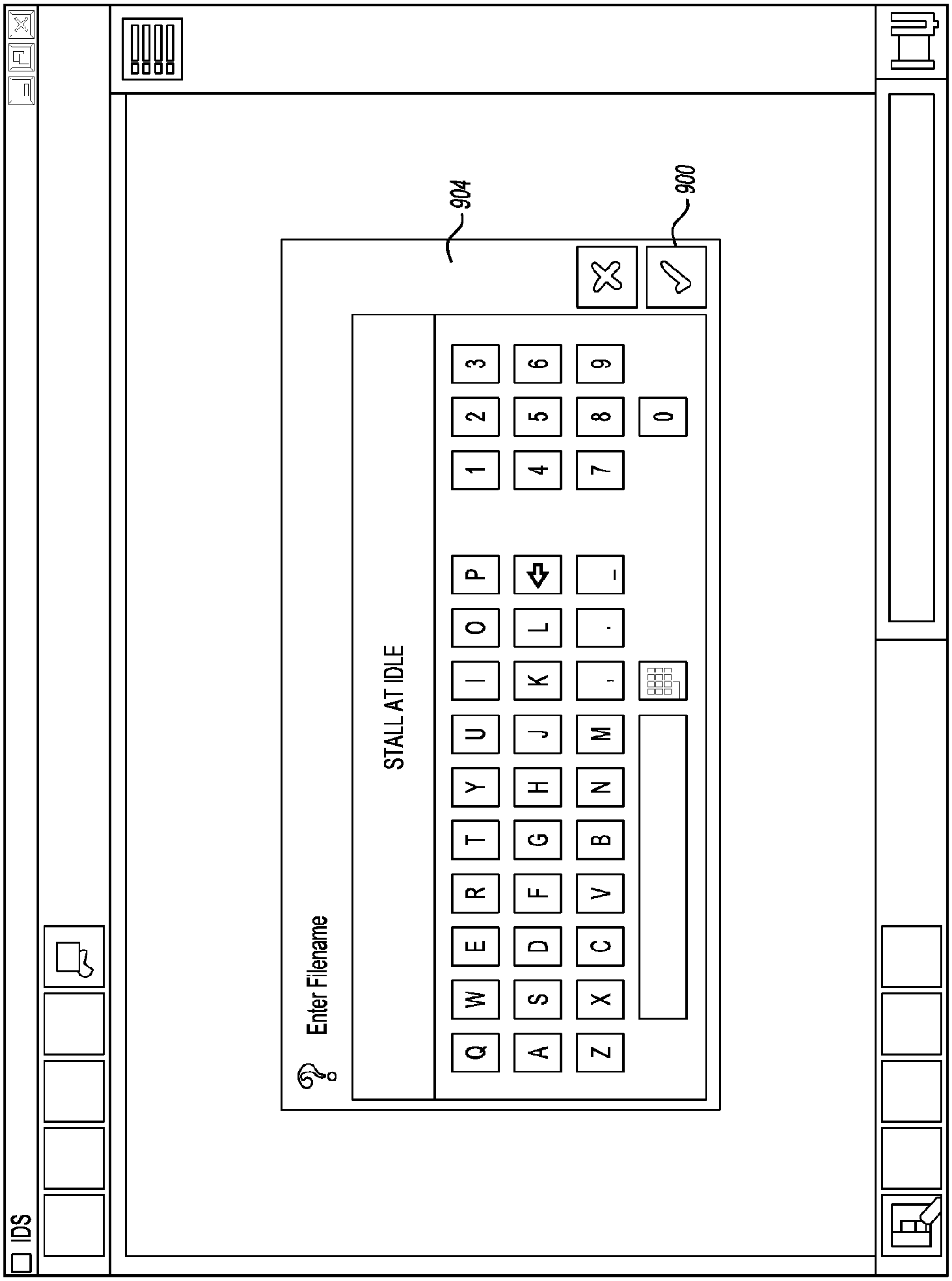

In one embodiment, the user can enter a filename for the stored data as illustrated in FIG. 20. An input box 904 may be presented to the user for entering the filename. The user may then submit the given filename by selecting button 900.

Figure 8:
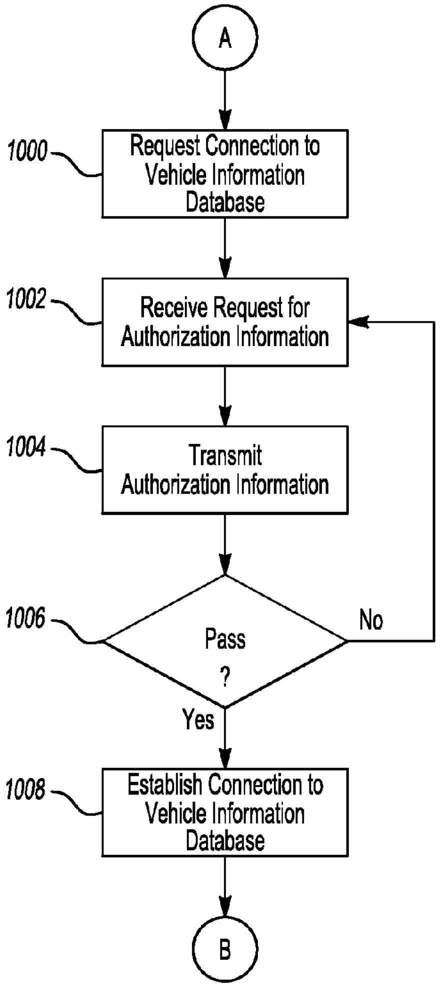
FIG. 8 illustrates an operation for communicating with a vehicle information database having vehicle diagnostic data definition information.

In one embodiment, as part of data playback, the VDR application 204 may request and receive information from the vehicle information database 108. As described above, the information received from the database 108 may include (but is not limited to) diagnostic data definitions of the data received from the vehicle 102. As such, a determination may be made whether a connection to the vehicle information database 108 has been established (block 810). If not, the process for establishing a connection to the database 108 may be activated as represented by circle block A and illustrated in FIG. 8.

Referring to FIG. 9, a request to establish a connection with the database 108 may be transmitted to the server housing the database 108 (block 1000). The request may be transmitted manually (e.g., via user action) or automatically.

In one embodiment, the database 108 (via server 106 or another server (not shown)) may transmit a request for authorization information which may be received by terminal 104, as illustrated in block 1002. Non-limiting examples of authorization information may include any secure way of identifying an authorized user (e.g., and without limitation, a username and password).

The user may input authorization information and the authorization information may be transmitted to the server 106 (or other server) for access to database 108 (block 1004). As illustrated in block 1006, the authorization information may be validated. If the authorization information is not recognized (or does not pass), another request for authorization information may be received at terminal 104 and the information re-transmitted (block 1006). If the authorization information is valid (or passes), the connection to the database is established (block 1008). The process may then continue at circle block B.

It should be understood that a database connection (via server 106) may be established at anytime that is suitable for the various contemplations of the invention. As a non-limiting example, a connection may be alternatively established at activation of the VDR application 204.

Once a connection is established, the VDR application 204 may receive the diagnostic data definitions from the database 108 (block 812).

Figure 21:
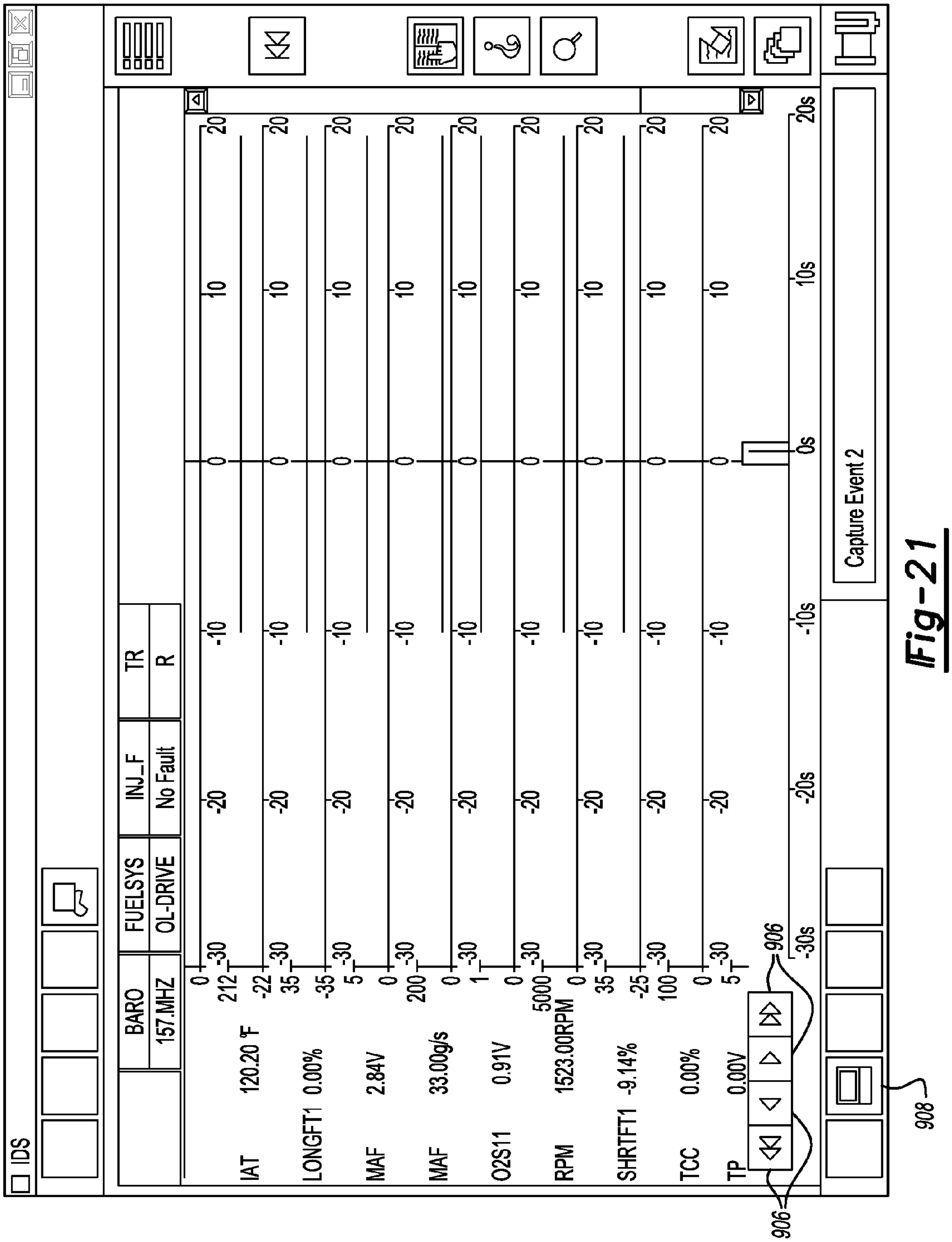
Figure 22:
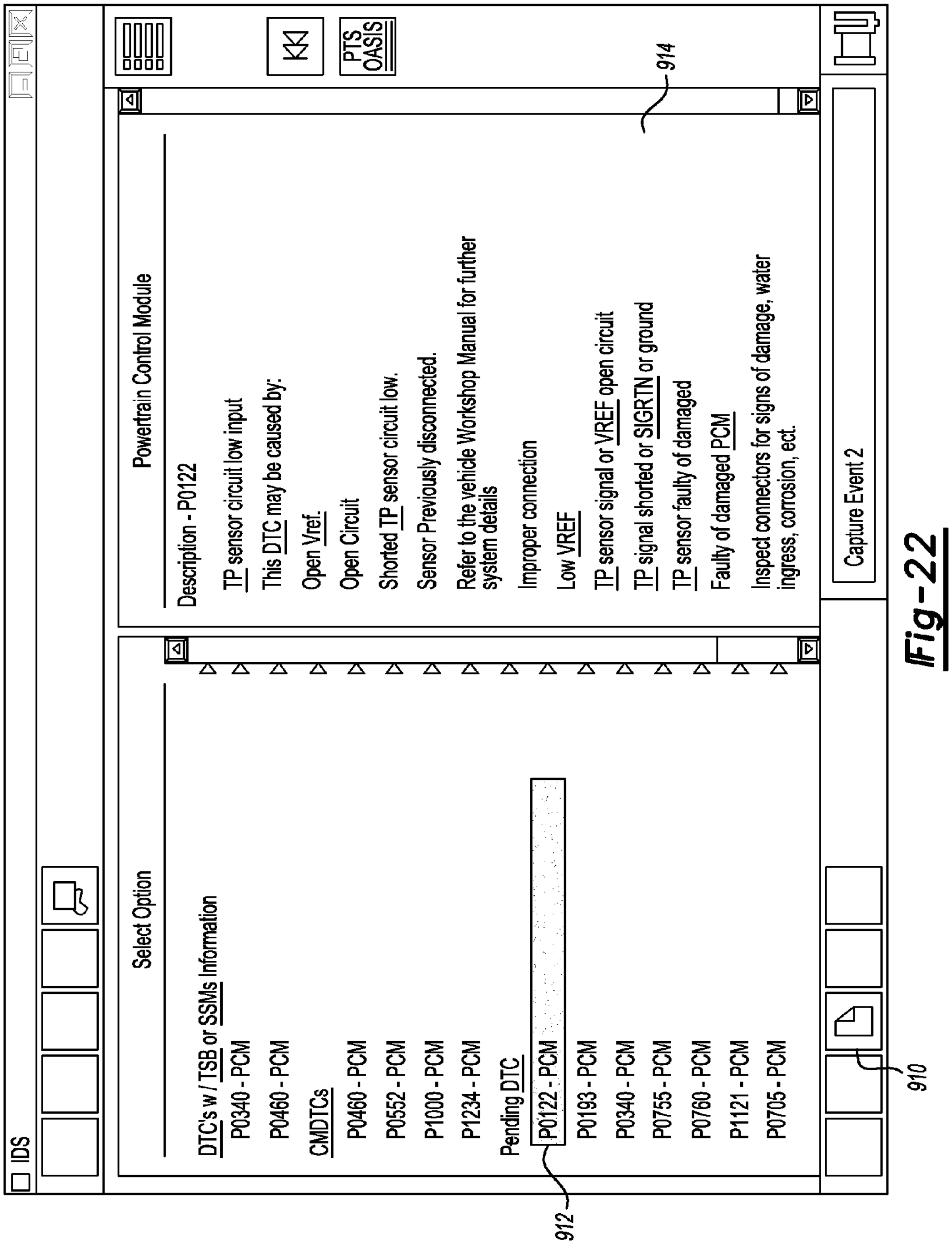

Referring back to FIG. 7, The data recorded from vehicle 102 may be played back (block 814) and displayed (block 816) to the user in response to instructions from the user. FIGS. 21 and 22 illustrates two non-limiting examples of GUIs presented to a user for data playback.

In the non-limiting example illustrated in FIG. 21, the user may utilize buttons 906 for playback. This GUI may be displayed to the user upon selection of tab 908.

The GUI displayed in FIG. 22 may be displayed to the user upon selection of button 910. In the non-limiting example illustrated in FIG. 22, the user is shown the list of DTCs received from the vehicle 102 (box 912) and the corresponding data definitions (box 914). In this non-limiting example, the user is shown the corresponding data definition for the "P0122-PCM" DTC selected by the user.

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed is:

1. A vehicle data recording system comprising:

a computer for installation in a vehicle to record diagnostic vehicle data, the computer being configured to:

receive input from memory including a plurality of vehicle data recording parameters which comprise a vehicle data recording configuration;

receive from one or more manual vehicle inputs an occupant initiated data recording trigger signal;

upon receipt of the trigger signal, receive diagnostic data from one or more vehicle modules over a vehicle network communicating with the computer, the diagnostic data being based on the vehicle data recording configuration; and store the diagnostic data in memory for diagnosing one or more vehicle concerns.

2. The system of claim 1 wherein the memory is portable memory.

3. The system of claim 2 wherein the portable memory is selected from the group consisting of a USB drive, a memory card, and an external hard drive.

4. The system of claim 3 wherein the computer is further configured to transmit the diagnostic data to the portable memory for storage.

5. The system of claim 1 wherein the memory is on a device selected from a personal computer, a mobile communication device, or a portable media player.

6. The system of claim 5 wherein the computer is further configured to transmit the diagnostic data to the device for storage and wherein the device is configured to output the stored diagnostic data to a user.

7. The system of claim 6 wherein the diagnostic data is transmitted to memory wirelessly.

8. The system of claim 6 wherein the output is a graphical output, textual output, audible output, or a combination of outputs.

9. The system of claim 1 wherein the vehicle data recording configuration comprise at least two vehicle data recording parameters.

10. The system of claim 9 wherein the at least two vehicle data recording parameters include an identification of the vehicle module, one or more diagnostic measurement units for the vehicle module, data recording time, and data for automatically triggering vehicle data recording.

11. The system of claim 1 wherein the memory further includes one or more vehicle data recording programs, wherein the computer is further configured to receive at least one vehicle data recording program from memory for installation to the computer.

12. The system of claim 11 wherein the vehicle data recording program is a transient program.

13. A method comprising:

receiving an input from memory including vehicle data recording parameters;

receiving an occupant initiated data recording trigger signal from a manual vehicle input;

receiving diagnostic data based on the vehicle data recording parameters over a vehicle network upon receipt of the trigger signal; and storing the diagnostic data in memory for diagnosing vehicle concerns.

14. The method of claim 13 wherein the vehicle data recording parameters include an identification of a vehicle module for diagnosis, one or more diagnostic measurement units for the vehicle module, data recording time, and data for automatically triggering vehicle data recording.

15. The method of claim 13 wherein storing the diagnostic data in memory further includes buffering the diagnostic data.

16. The method of claim 13 wherein the trigger signal is a user activated trigger signal from a manual vehicle input selected from at least one of a voice input, a steering wheel input, a center stack input, a touchscreen input, or combinations thereof.

17. The method of claim 13 wherein the trigger signal is an automatic trigger signal received from at least one of a powertrain control module, an engine control module, a vehicle control module, or combinations thereof.

18. The method of claim 13 further comprising:

establishing a connection with a vehicle information server having a vehicle information database, the vehicle information database having diagnostic data definitions corresponding to the diagnostic data;

receiving the diagnostic data definitions; and presenting the diagnostic data definitions for the corresponding diagnostic data.

19. A computer program product for vehicle data recording, the computer program product being embodied in a non-transitory computer readable medium in a computer for installation in a vehicle, the computer program product comprising instructions for:

establishing a connection with a device having memory, the memory including a plurality of vehicle data recording parameters which comprise a vehicle data recording configuration;

receiving over the connection the vehicle data recording configuration stored in memory;

receiving from one or more manual vehicle inputs an occupant initiated data recording trigger signal;

upon receipt of the trigger signal, receiving diagnostic data from one or more vehicle modules over a vehicle network communicating with the computer, the diagnostic data being based on the vehicle data recording configuration; and transmitting the diagnostic data to memory, wherein the diagnostic data is stored in memory for diagnosing one or more vehicle concerns.

20. The computer program product of claim 19 wherein the connection is an Internet connection and transmitting the diagnostic data includes transmitting the diagnostic data over the Internet connection.

* * * * *

UNITED STATES PATENT AND TRADEMARK OFFICE

CERTIFICATE OF CORRECTION

PATENT NO. : 8,296,007 B2
APPLICATION NO. : 12/774008
DATED : October 23, 2012
INVENTOR(S) : Radhakrishnan Swaminathan et al.

It is certified that error appears in the above-identified patent and that said Letters Patent is hereby corrected as shown below:

On the face of the Patent:

(75) Inventors:

Delete “James Eric Kamiske” and insert -- JAMES ERIC KAMINSKE --.

Signed and Sealed this
Fourth Day of December, 2012

David J. Kappos

David J. Kappos
*Director of the United States Patent and Trademark Office*